US007243878B2

(12) United States Patent
Peterson et al.

(10) Patent No.: US 7,243,878 B2
(45) Date of Patent: *Jul. 17, 2007

(54) REGIONAL AIRCRAFT BOARDING MODULES, AND METHODS OF USING SAME

(75) Inventors: Robert L. Peterson, Salt Lake City, UT (US); John N. Greaves, Holladay, UT (US)

(73) Assignee: Gatelink Aircraft Boarding Systems, Inc., Salt Lake City, UT (US)

( * ) Notice: Subject to any disclaimer, the term of this patent is extended or adjusted under 35 U.S.C. 154(b) by 507 days.

This patent is subject to a terminal disclaimer.

(21) Appl. No.: 10/756,648

(22) Filed: Jan. 12, 2004

(65) Prior Publication Data

US 2005/0056725 A1  Mar. 17, 2005

Related U.S. Application Data

(63) Continuation-in-part of application No. 10/661,942, filed on Sep. 12, 2003, now Pat. No. 6,929,717.

(51) Int. Cl.
*B64F 1/32* (2006.01)
(52) U.S. Cl. .......................... 244/114 R; 52/32; 52/33
(58) Field of Classification Search ............ 244/114 R; 52/32, 33
See application file for complete search history.

(56) References Cited

U.S. PATENT DOCUMENTS

| 6,279,855 | B1 * | 8/2001 | Domer | 244/114 R |
| 6,315,243 | B1 * | 11/2001 | Peterson | 244/114 R |
| 6,732,975 | B2 * | 5/2004 | Peterson | 244/114 R |
| 2002/0145079 | A1 * | 10/2002 | Burley | 244/114 R |

OTHER PUBLICATIONS

DEW Press Release, Jan. 12, 2000, http://www.dewengineering.com/pr/dewbridge20000112.html.*
Apron Drive Dew-Bridge, Dec. 21, 2001, http://web.archive.org/web/20011221111812/dewbridge.com/products/aprondrive.html.*
Skywalker Boarding Bridge, Feb. 23, 2005, http://web.archive.org/web/20050223054505/accessairsystems.com/skywalker.html.*

* cited by examiner

*Primary Examiner*—J. Woodrow Eldred

(57) ABSTRACT

A regional aircraft boarding module can be provided at an airport concourse in place of or in addition to a conventional large aircraft boarding bridge. The regional aircraft boarding module includes regional aircraft rotunda between a number of secondary passenger bridges that are coupled to the regional aircraft rotunda. A method of using the regional aircraft boarding module includes an activity selected from docking a regional aircraft thereto, interfacing a large aircraft boarding bridge thereto, and combinations thereof.

21 Claims, 15 Drawing Sheets

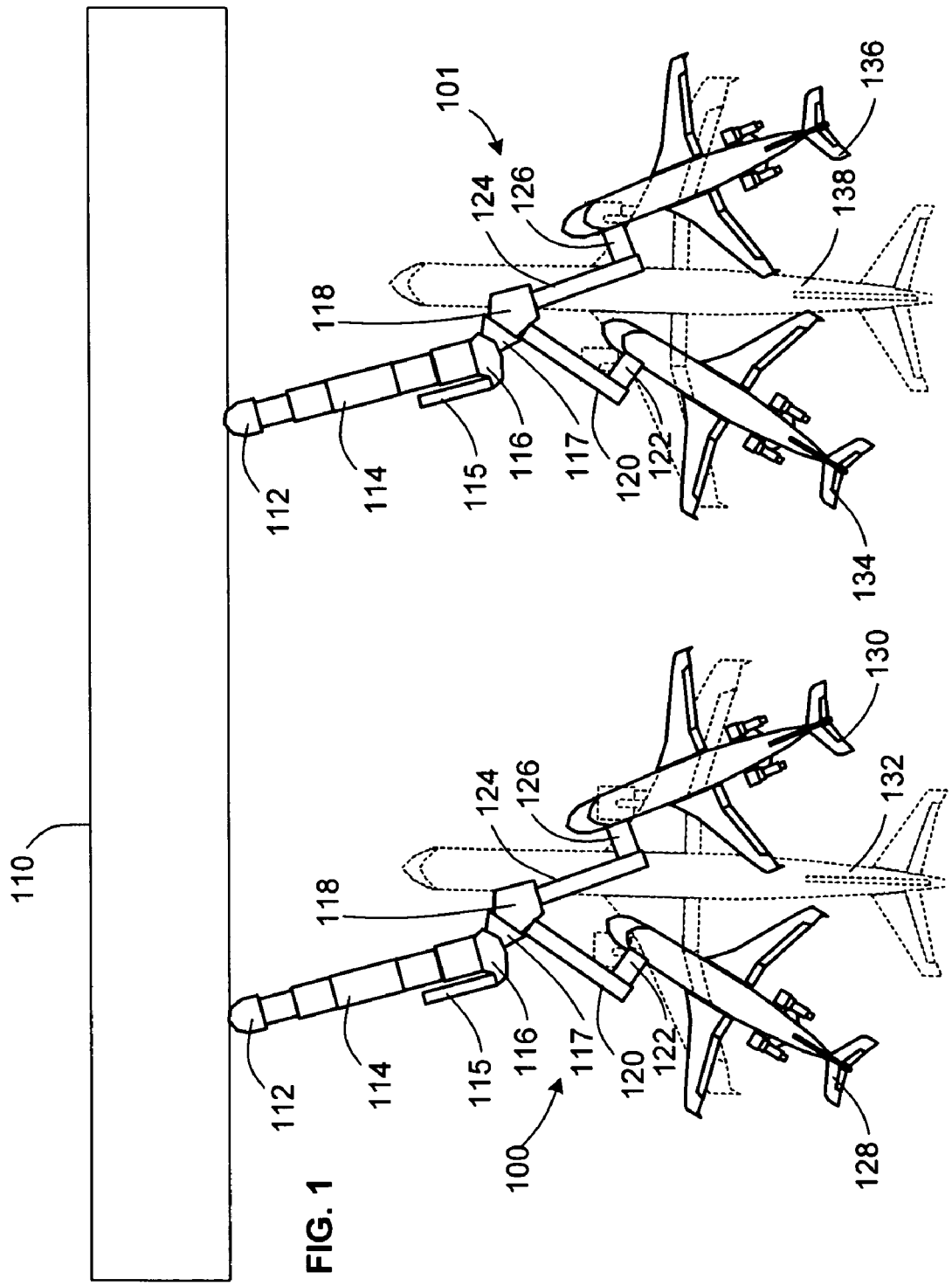

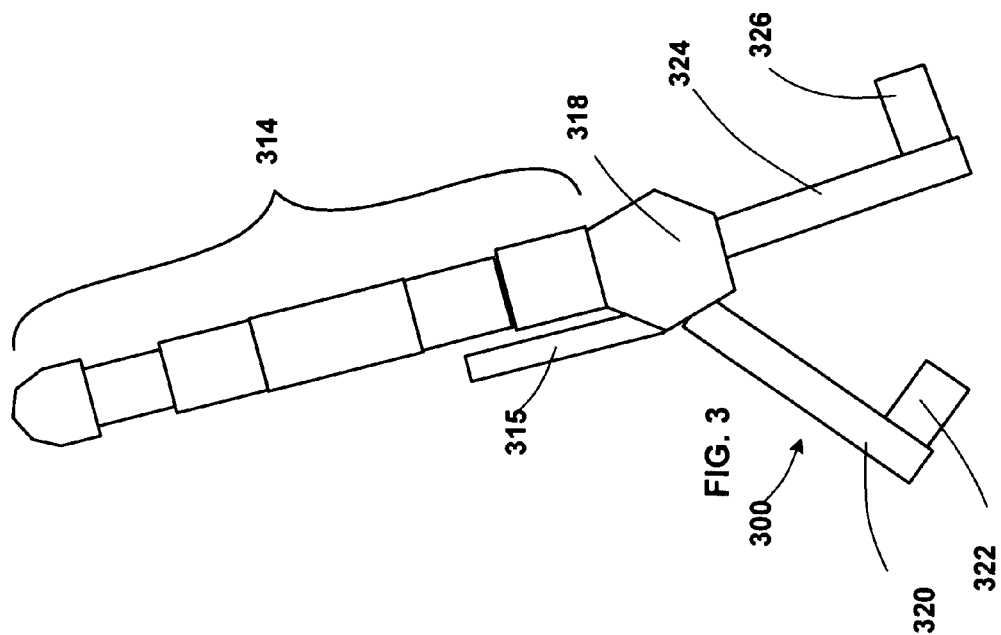
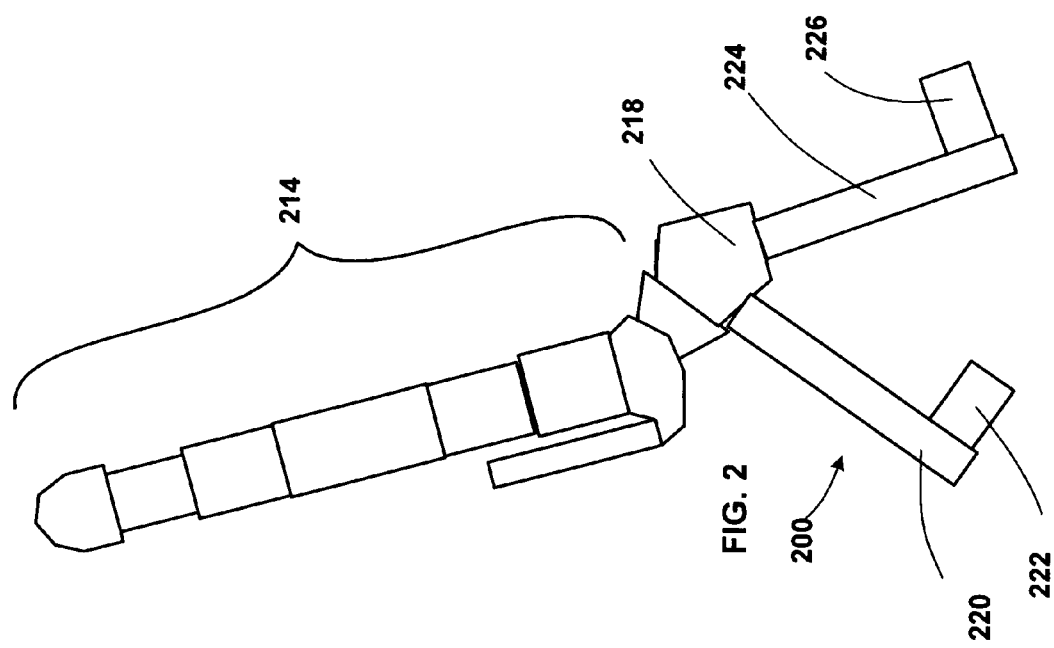

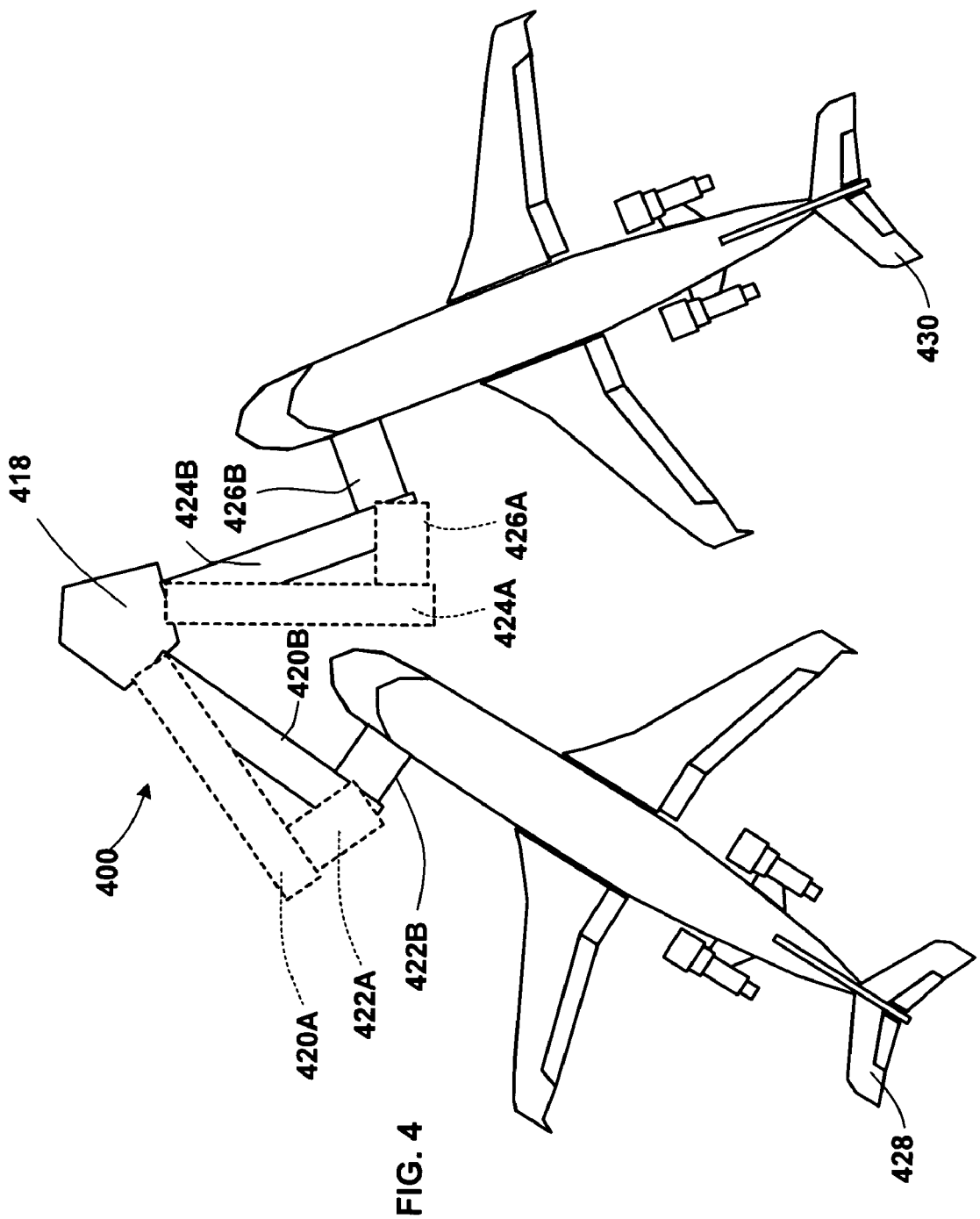

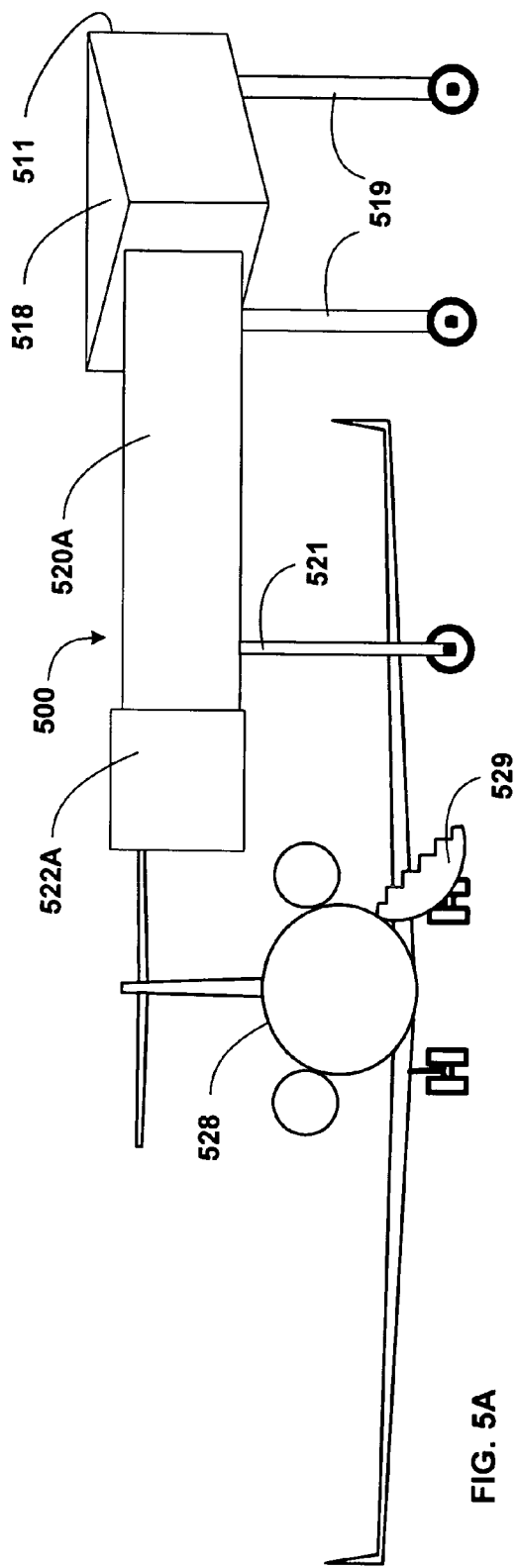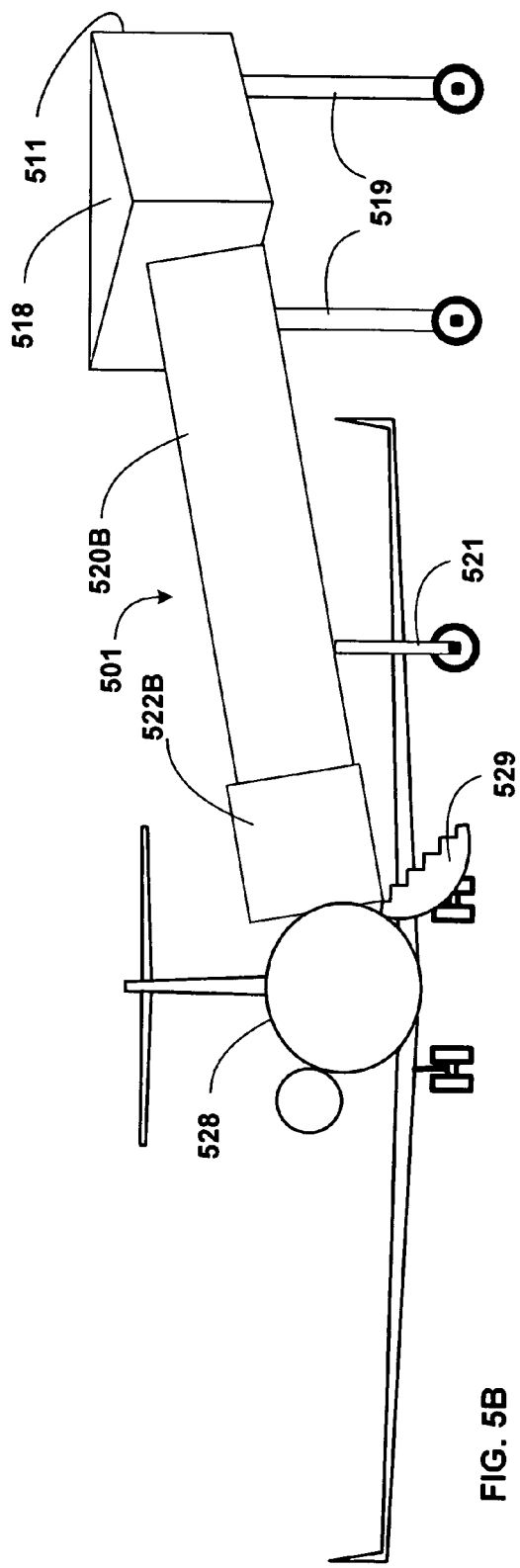
FIG. 5A
FIG. 5B

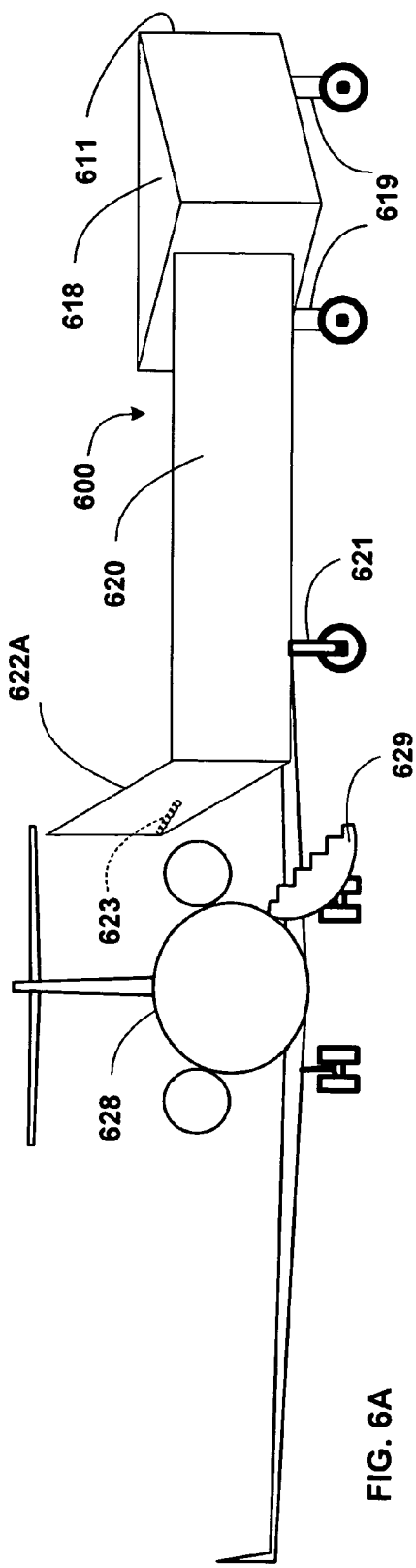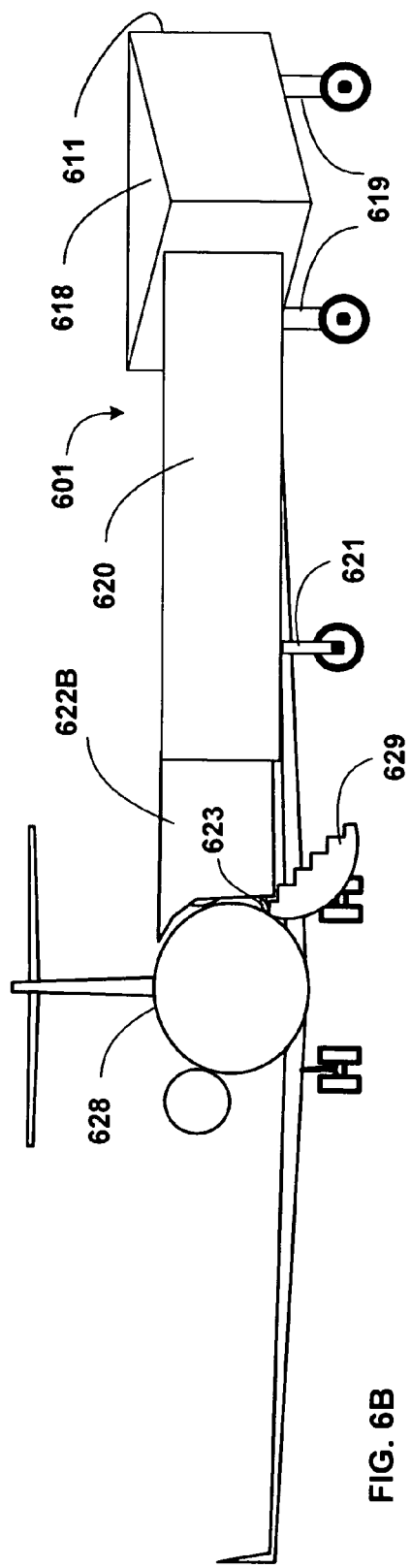
FIG. 6A
FIG. 6B

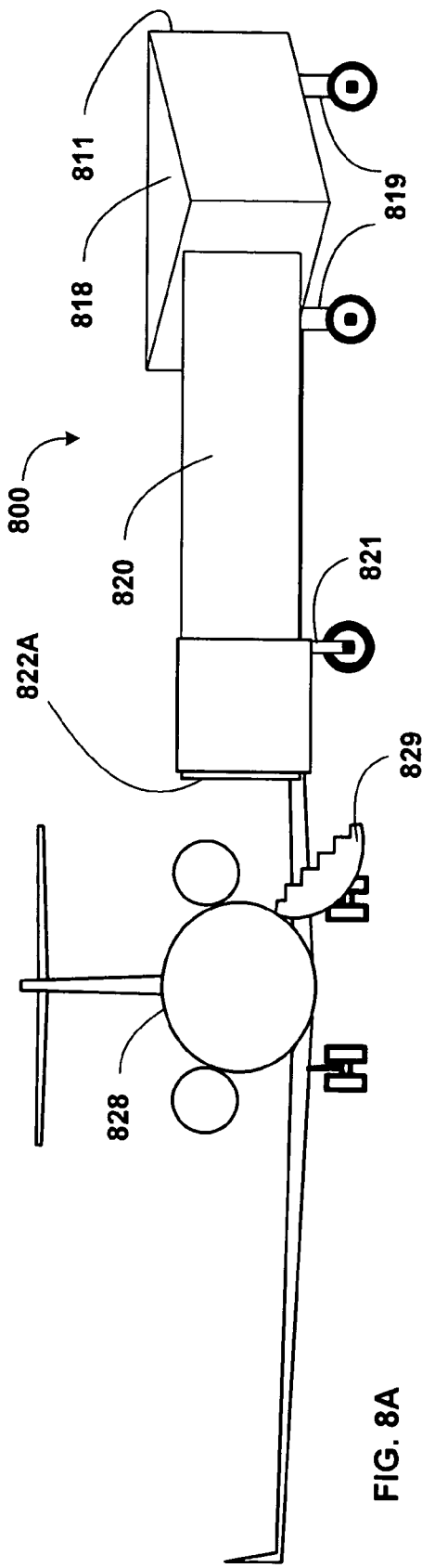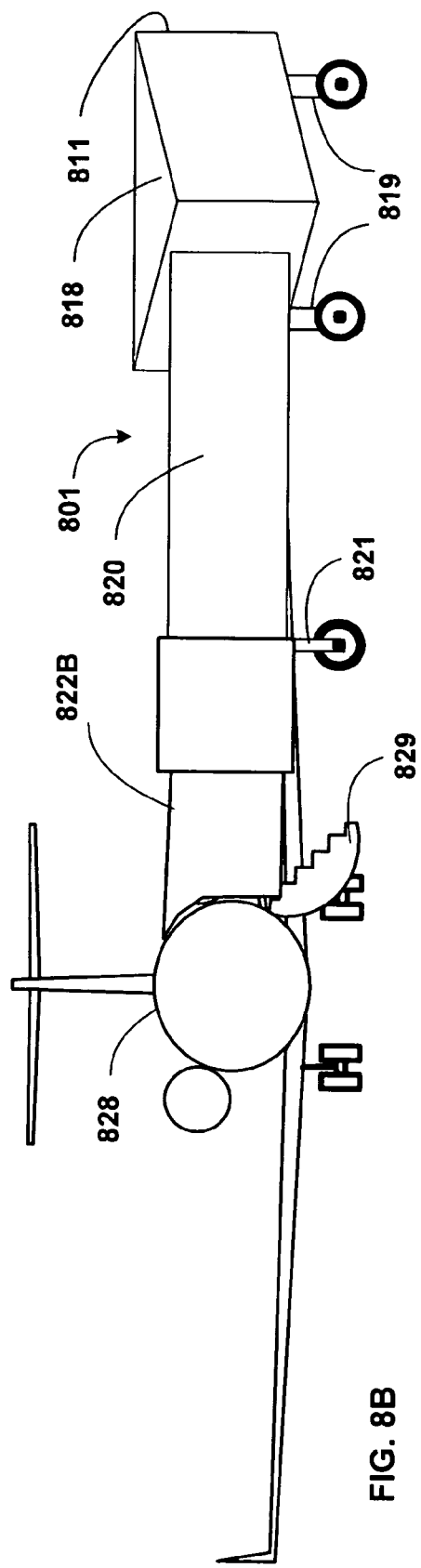
FIG. 8A
FIG. 8B

REGIONAL AIRCRAFT BOARDING MODULES, AND METHODS OF USING SAME

RELATED APPLICATIONS

This is a Continuation-In-Part of U.S. patent application Ser. No. 10/661,942, filed Sep. 12, 2003 now U.S. Pat. No. 6,929,717, the entire disclosure of which is incorporated herein by specific reference.

TECHNICAL FIELD

An embodiment relates to the field of airline travel. More particularly, an embodiment relates to the field of aircraft boarding piers, specifically to a regional aircraft boarding module that services regional aircraft. An embodiment provides among other things the regional aircraft boarding module in an airport concourse with existing bridges for larger jet passenger aircraft.

TECHNICAL BACKGROUND

Air travel has becoming increasing popular over the past decade and has evolved to handle an ever growing passenger volume. An important aspect of this evolution is the structure of flight routes through a "hub" airport. Today, hub routing has become an essential part of the efficient operation of an airline.

This trend has been aided by the advent of regional aircraft. As used herein, the term "regional aircraft" refers to jet or propeller aircraft that are smaller than typical large commercial airline passenger jets. Regional aircraft will typically be identified as having about 110 seats or less. Aircraft with more than 110 seats and which are used to travel traditional airline routes between major airports are considered "large aircraft" or "large jets" herein. The advent of regional aircraft has created a new market for air travel in which air passengers can span relatively large distances quickly on a regional aircraft.

Manufacturers of regional aircraft, particularly craft with 75 or fewer seats, include Brazilian aircraft maker Embraer SA, Canada's Bombardier and Fairchild Aerospace of the United States. The popularity of regional aircraft produced by these manufacturers has exceeded expectations. For example, Bombardier forecast initial sales of 400 aircraft when it launched its regional jet model in the early 1990s. Bombardier instead received orders and options for 1,066 of its CRJ-200 50-seater and larger CRJ-700 derivative. Similarly, Embraer booked dozens more orders than expected for its ERJ-135 and ERJ-145 aircraft at a recent Paris airshow.

Capitalizing on this strong commercial interest, Bombardier has launched the CRJ-700, a 70-seat aircraft, and plans an even larger BRJ-X model with 90 or 110 seats. Fairchild has recently launched the 70-seat 728JET and also offers a longer version with around 100 seats. Embraer has also booked orders for its new ERJ-170 and ERJ-190, with about 70 and 100 seats, respectively.

Following the terrorist attacks on the United States by use of four large aircraft on Sep. 11, 2001, the use of large aircraft has decreased, and regional aircraft have taken several of the routes in the stead of the large aircraft. This decrease in large jet usage has placed a greater demand on airport space and a decreased ratio has occurred between existing apron space, and the number of passenger seats that are available at large aircraft gates.

One problem with regional aircraft travel is that the regional aircraft terminal is often located at a site remote from the main terminal. Consequently, a passenger on a regional aircraft, whether transferring to or from a large aircraft, needs to traverse the length of the airport and/or travel between terminals to make the transfer. As air travel becomes increasingly popular and important to the economy, the regional aircraft passenger represents an increasing share of the air travel market. Consequently, a significant problem is presented by the remote location of the regional aircraft terminal that prevents quick and seamless plane transfers for the regional aircraft passenger. Additionally, the remote location of the regional aircraft terminal also affects airline scheduling for large aircraft because passengers must be allowed time to traverse the often large distances between a regional aircraft boarding gate and the boarding gate for the large aircraft.

Another problem with regional aircraft travel is that the passenger is frequently required to walk outside on the tarmac and climb stairs to board the regional aircraft. If the weather is inclement, boarding and deplaning from a regional aircraft is made more difficult than boarding and deplaning from large aircraft entirely within the closed and conditioned space of conventional airports that have been developed for large aircraft.

Where a passenger is unable to walk, boarding a regional aircraft from the tarmac in a wheelchair can present additional problems. In the past, these problems have been addressed by building some kind of wheelchair lift. However, such boarding is often time consuming and can be a source of embarrassment or self-consciousness for the wheelchair passenger. The combination of a wheelchair lift and inclement weather may make the prospect of regional aircraft travel even less acceptable for disabled passengers.

One challenge with integrating regional aircraft at a concourse with large aircraft is interfacing enough regional aircraft to the concourse without significantly diminishing the number of passenger seats with respect to the useable apron space. Another challenge is the cost of retrofitting a conventional concourse to accommodate a regional aircraft.

Consequently, there is a need in the art to make regional aircraft travel more convenient and efficient.

BRIEF DESCRIPTION OF THE DRAWINGS

In order to understand the manner in which embodiments are obtained, a more particular description of various embodiments briefly described above will be rendered by reference to the appended drawings. Understanding that these drawings depict only typical embodiments that are not necessarily drawn to scale and are not therefore to be considered to be limiting in scope, the embodiments will be described and explained with additional specificity and detail through the use of the accompanying drawings in which:

FIG. 1 is a plan of two regional aircraft boarding modules for docking about two regional aircraft each according to an embodiment;

FIG. 2 is a plan of a regional aircraft boarding module as it interfaces with a large aircraft passenger bridge according to an embodiment;

FIG. 3 is a plan of a regional aircraft boarding module as it interfaces with a large aircraft passenger bridge according to an embodiment;

FIG. 4 is a plan of a regional aircraft boarding module that includes a laterally articulating regional aircraft passenger bridge according to an embodiment;

FIG. 5A is an elevation of a regional aircraft boarding module that includes a vertically articulating regional aircraft passenger bridge according to an embodiment;

FIG. 5B is an elevation of a regional aircraft boarding module that includes the vertically articulating regional aircraft passenger bridge depicted in FIG. 5A after coupling with a regional aircraft according to an embodiment;

FIG. 6A is an elevation of a regional aircraft boarding module that includes a vertically articulating cab according to an embodiment;

FIG. 6B is an elevation of a regional aircraft boarding module that includes the vertically articulating cab depicted in FIG. 6A after coupling with a regional aircraft according to an embodiment;

FIG. 8A is an elevation of a regional aircraft boarding module that includes a telescopingly movable cab according to an embodiment;

FIG. 8B is an elevation of a regional aircraft boarding module that includes the telescopingly movable cab depicted in FIG. 8A after coupling with a regional aircraft according to an embodiment;

DETAILED DESCRIPTION

Figure 7:
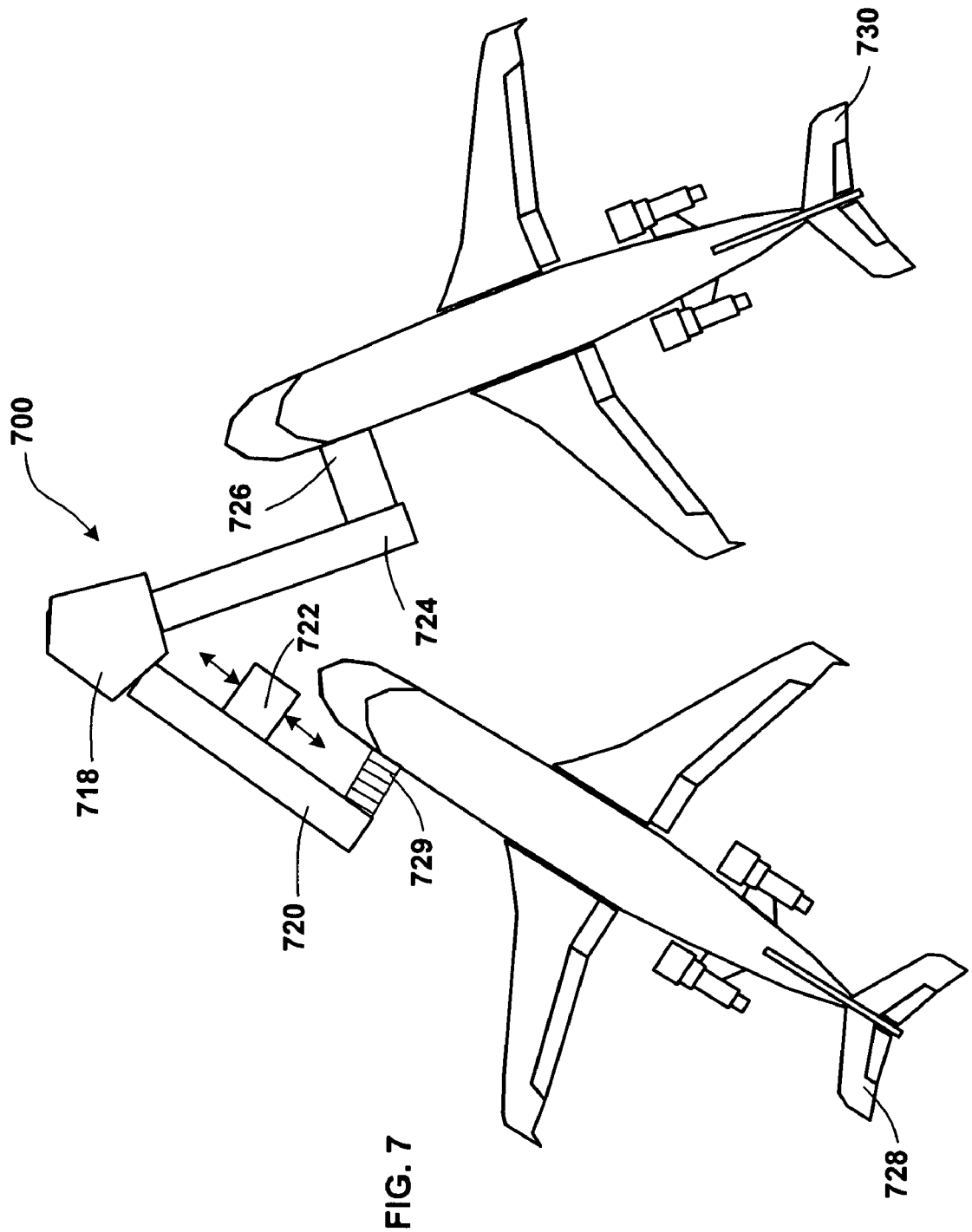
FIG. 7 is a plan of a regional aircraft boarding module that includes a slidingly movable cab according to an embodiment.

In the following detailed description, reference is made to the accompanying drawings which form a part hereof, and in which is shown, by way of illustration, specific ways which embodiments may be practiced. In the drawings, like numerals describe substantially similar components throughout the several views. These embodiments are described in sufficient detail to enable those skilled in the art to practice various embodiments. Other embodiments may be utilized and structural, logical, and layout changes may be made without departing from the scope of the various embodiments.

The term "large aircraft" is an aircraft with more than about 110 passenger seats. Large aircraft can be either jet or propeller driven. Examples of large aircraft include the DC-9 or Boeing 717 at the smaller end of the scale, up to the Boeing 767 at the larger end of the scale. The term "regional aircraft" is an aircraft with a passenger capacity from about 6 to about 110 passengers. Examples of regional aircraft include aircraft made by LM Bombardier, Embraer, Fairchild Aerospace, Gulf Stream, Cessna, Learjet, and others. The term "jumbo" aircraft relates to an aircraft of the class such as a Boeing® 747 or 777.

The term "module" can mean an apparatus that can interface with a plurality of regional aircraft and with at least one of a large aircraft passenger bridge and an airport concourse.

In an embodiment, many of the problems of the prior art can be overcome with a regional aircraft boarding module, described in detail below, which is integrated into a common concourse with boarding facilities for large aircraft. As used herein, a "concourse" is a single structure or wing of an airport with sequentially numbered boarding gates for passenger aircraft. The term airport "terminal" is synonymous with concourse or denotes a group of interconnected concourses.

FIG. 1 is a plan of two regional aircraft boarding modules 100 and 101 for docking about two regional aircraft each according to two respective embodiments. A concourse 110 is depicted by its external boundary. The concourse 110 provides an anchor location for the regional aircraft boarding module 100 and/or 101. In an embodiment, the concourse 110 is a ground-level structure that allows passengers to walk up a ramp until the sill of a given aircraft is reached. In an embodiment, the concourse 110 is a conventional elevated structure that allows passengers to walk down a ramp until the sill of a given aircraft is reached.

A conventional passenger bridge is depicted coupled to the concourse 110. A conventional rotunda 112 is coupled to a passenger bridge 1114, which in turn is coupled to a cab 116. One ancillary structure of the cab 116 includes a skirt 117 that conventionally interfaces with a large or jumbo aircraft. Another ancillary structure includes a boarding bridge stair 115 that includes stairs from the cab 116 down to the tarmac.

The regional aircraft boarding module 100 includes a regional aircraft rotunda 118, and a plurality of secondary aircraft passenger bridges. In an embodiment, the regional aircraft boarding module 100 includes a first regional aircraft passenger bridge 120 and a first regional aircraft cab 122, a second regional aircraft passenger bridge 124, and a second regional aircraft cab 126. In an embodiment, the regional aircraft cabs 122 and 126 include structures similar to the skirt 117. In an embodiment, the regional aircraft cabs 122 and 126 are slidingly attached to their respective secondary aircraft passenger bridges 120 and 124 as set forth in this disclosure. In an embodiment, the regional aircraft cabs 122 and 126 are telescopingly and slidingly attached to their respective secondary aircraft passenger bridges 120 and 124 as set forth in this disclosure. In an embodiment, the first regional aircraft passenger bridge 120 and the second regional aircraft passenger bridge 124 are each coupled to the regional aircraft rotunda 118.

In an embodiment, the passenger bridge 114 is moved by an apron drive that includes three degrees of freedom. In an embodiment, the passenger bridge 114 is moved by a fixed, elevating drive that includes an elevating cab that hinges from the concourse 110. In an embodiment, the passenger bridge 114 is a radial bridge that includes a non-telescoping rotational and vertical movement capability. In an embodiment, the passenger bridge 114 is replaced by a fixed passenger tunnel that has no significant movement capabilities. It is understood that a fixed passenger tunnel is a structure that requires an interface such as a passenger bridge in order to couple to an aircraft. In an embodiment, the fixed tunnel can include a stairway such as a boarding bridge stair or a simple exit. Throughout this disclosure, the "passenger bridge" that couples to a regional aircraft boarding module 100 can be any of these embodiments.

Operation of the regional aircraft boarding module 100 includes docking at least one regional aircraft thereto. In an embodiment, a first regional aircraft 128 is docked to the regional aircraft passenger bridge 120. In an embodiment, a second regional aircraft 130 is docked to the regional aircraft passenger bridge 124 of the regional aircraft boarding module 100. Similarly, operation of the regional aircraft boarding module 101 includes docking at least one regional aircraft thereto. In an embodiment, a third regional aircraft 134 is docked to a regional aircraft passenger bridge 120. In an embodiment, a fourth regional aircraft 136 is docked to a regional aircraft passenger bridge 124 of the regional aircraft boarding module 101.

In an embodiment, the docking bay area for the regional aircraft 128 and 130 is the docking bay area for a jumbo aircraft 132 such as a Boeing 767 widebody jet. In an embodiment, the docking bay area for the regional aircraft 134 and 136 is the docking bay area for a large aircraft 138 such as a Boeing 737 jet or a Boeing 757 jet. Where a given large or jumbo aircraft has a given wingspan, the wingspan is the major characteristic dimension that relates to the docking bay area sufficient for about only a single large or jumbo aircraft. The area is calculated by adding the depth dimension from the exterior of the concourse to the object-free line (not pictured). In any event, the minimum of such an area is the wingspan length, multiplied by the fuselage length.

Because the exact docking bay area sufficient for about only a single large or jumbo aircraft, varies among airports, and indeed within a single airport, another definition of "the docking bay area sufficient for about only a single large or jumbo aircraft" includes the area between two docking bays, which previously supported a large or jumbo aircraft.

In an embodiment, the docking bay area that is sufficient for about only a single large or jumbo aircraft (henceforth, "large aircraft"), includes about 1.0 times the existing docking bay area for a single large aircraft. In an embodiment, the docking bay area that is sufficient for about only a single large aircraft, includes about 1.9 times the existing area for a single large aircraft. In an embodiment, the docking bay area that is sufficient for about only a single large aircraft, includes about 1.8 times the existing area for a single large aircraft. In an embodiment, the docking bay area that is sufficient for about only a single large aircraft, includes about 1.7 times the existing area for a single large aircraft. In an embodiment, the docking bay area that is sufficient for about only a single large aircraft, includes about 1.6 times the existing area for a single large aircraft. In an embodiment, the docking bay area that is sufficient for about only a single large aircraft, includes about 1.5 times the existing area for a single large aircraft. In an embodiment, the docking bay area that is sufficient for about only a single large aircraft, includes about 1.4 times the existing area for a single large aircraft. In an embodiment, the docking bay area that is sufficient for about only a single large aircraft, includes about 1.3 times the existing area for a single large aircraft. In an embodiment, the docking bay area that is sufficient for about only a single large aircraft, includes about 1.2 times the existing area for a single large aircraft. In an embodiment, the docking bay area that is sufficient for about only a single large aircraft, includes about 1.1 times the existing area for a single large aircraft. In an embodiment, the docking bay area that is sufficient for about only a single large aircraft, includes less than 1.0 times the existing docking bay area for only a single large aircraft.

When a regional aircraft (RA) at the regional aircraft boarding module 100 is ready to push back, it must trace a path that clears the wingtips of adjacent aircraft.

FIG. 2 is a plan of a regional aircraft boarding module 200 as it interfaces with a large aircraft passenger bridge 214 according to an embodiment. The large aircraft passenger bridge 214 includes such structures as a rotunda, a passenger bridge, a cab, a skirt, and a boarding bridge stair. The regional aircraft boarding module 200 includes a regional aircraft rotunda 218, a first regional aircraft passenger bridge 220 with an accompanying first regional aircraft cab 222, and a second regional aircraft passenger bridge 224 with an accompanying second regional aircraft cab 226. The regional aircraft boarding module 200 in configured to interface with the conventional cab of the large aircraft passenger bridge 214. In an embodiment, the regional aircraft rotunda 218 has an interface surface that abuts the skirt 117 (see FIG. 1) that allows for seamless passenger ingress and egress between the regional aircraft boarding module 200 and the large aircraft passenger bridge 214. In an embodiment, each of the first regional aircraft passenger bridge 220 and the second regional aircraft passenger bridge 224 are coupled to the regional aircraft rotunda 218.

FIG. 3 is a plan of a regional aircraft boarding module 300 as it interfaces with a large aircraft passenger bridge 314 according to an embodiment. The large aircraft passenger bridge 314 includes such structures as a rotunda and a passenger bridge. The regional aircraft boarding module 300 includes a regional aircraft rotunda 318 and an optional boarding bridge stair 315. Additionally, the regional aircraft boarding module 300 includes a first regional aircraft passenger bridge 320 with an accompanying first regional aircraft cab 322, and a second regional aircraft passenger bridge 324 with an accompanying second regional aircraft cab 326. The regional aircraft boarding module 300 in configured to be directly connected to a conventional large aircraft passenger bridge that has been designed and/or reconfigured without a conventional cab (a process called "decabitation").

In an embodiment, the regional aircraft rotunda 318 has an interface surface that abuts the large aircraft passenger bridge 314 that allows for seamless passenger ingress and egress between the regional aircraft boarding module 300 and the large aircraft passenger bridge 314. In an embodiment, the combination of large aircraft passenger bridge 314 and regional aircraft boarding module 300 is an integral structure. In an embodiment, the combination of large aircraft passenger bridge 314 and regional aircraft boarding module 300 is two abutting structures. In an embodiment, each of the first regional aircraft passenger bridge 320 and the second regional aircraft passenger bridge 324 are coupled to the regional aircraft rotunda 318.

The regional aircraft rotunda 318 is depicted in FIG. 3 as a hexagon. The regional aircraft rotunda 218 in FIG. 2 is depicted as a pentagon. Other shapes for regional aircraft rotunda embodiments include a polygon including a square or a rectangle or a triangle. Other shapes for regional aircraft rotunda embodiments include curvilinear shapes such as a circle, an oval, or a "racetrack" shape. Other shapes for regional aircraft rotunda embodiments include combinations of rectilinear and curvilinear shapes according to specific embodiments. These various shapes are applicable to all embodiments set forth in this disclosure.

FIG. 4 is a plan of a regional aircraft boarding module 400 that includes a laterally articulating regional aircraft passenger bridge according to an embodiment. The regional aircraft boarding module 400 includes a regional aircraft rotunda 418, and a plurality of secondary aircraft passenger bridges. In an embodiment, the regional aircraft boarding module 400 includes a first regional aircraft passenger bridge 420A and a first regional aircraft cab 422A. The first regional aircraft passenger bridge 420A and the first regional aircraft cab 422A are depicted in dashed lines as representing an aircraft taxiing position therefor that allows a regional aircraft 428 to move into position to dock or that allows the regional aircraft 428 to push back. The first regional aircraft passenger bridge 420B and the first regional aircraft cab 422B are depicted in solid lines as representing an aircraft stationary position therefor that allows for seamless passenger ingress and egress while the regional aircraft 428 is docked. Similarly, a second regional aircraft passenger bridge 424A and a second regional aircraft cab 426A are depicted in dashed lines as representing an aircraft taxiing position therefor that allows a regional aircraft 430 to move into position to dock or that allows the regional aircraft 430 to push back. The second secondary aircraft passenger bridge 424B and the second regional aircraft cab 426B are depicted in solid lines as representing an aircraft stationary position therefor that allows for seamless passenger ingress and egress while the regional aircraft 430 is docked. In an embodiment, each of the first regional aircraft passenger bridge 420 and the second regional aircraft passenger bridge 424 are coupled to the regional aircraft rotunda 418.

FIG. 5A is an elevation of a regional aircraft boarding module 500 that includes a vertically articulating regional aircraft passenger bridge according to an embodiment. The regional aircraft boarding module 500 includes a regional aircraft rotunda 518 with a rotunda support structure 519 that is coupled to the rotunda 518. In an embodiment, the rotunda support structure 519 is wheeled. In an embodiment, the rotunda support structure 519 is a skid structure (not pictured). In an embodiment, the rotunda support structure 519 is a stationary foot structure (not pictured). The regional aircraft boarding module 500 includes a regional aircraft passenger bridge 520A that is in a upwardly articulated position relative to the regional aircraft rotunda 518. Although a single regional aircraft passenger bridge 520A is depicted, it is understood that a plurality of regional aircraft passenger bridges is attached to the rotunda 518. Similarly, the rotunda 518 is depicted in a schematic 3-dimensional view to illustrate that it provides an interface 511 for either a concourse or a conventional large aircraft passenger bridge, as well as a second regional aircraft passenger bridge (not pictured).

The concourse interfaces at the interface 511, whether by interfacing with a large aircraft passenger bridge cab, or by directly interfacing with the external wall of the concourse. The concourse provides an anchor location for the regional aircraft boarding module 500. In an embodiment, the concourse is a ground-level structure that allows passengers to walk up a ramp until the sill of a given aircraft is reached. In an embodiment, the concourse is a conventional elevated structure that allows passengers to walk down a ramp until the sill of a given aircraft is reached.

In an embodiment a regional aircraft passenger bridge support structure 521 supports the regional aircraft passenger bridge 520A in a suspended position above a regional aircraft. A regional aircraft cab 522A is also depicted as being suspended above the regional aircraft 528 and it is held in suspension while the aircraft stairway 529 articulates to full-open or full closed position. In an embodiment, the combination of the rotunda support structure 519 and the regional aircraft passenger bridge support structure 521, provide for module mobility to locate the regional aircraft boarding module 500 at either a concourse interface or a large aircraft passenger bridge interface, and for and passenger bridge maneuverability to dock the regional aircraft cab 522A with the regional aircraft 528. An example of module mobility can be seen in U.S. Pat. No. 5,524,318 to Thomas (which takes over the functionalities of at least one of the rotunda support structure 519 and the regional aircraft passenger bridge support structure 521), the disclosure of which is incorporated herein by reference.

In an embodiment, the regional aircraft boarding module 400 includes the regional aircraft passenger bridge 520A and the regional aircraft cab 522A in an aircraft taxiing position that allows the regional aircraft 528 to move into position to dock or that allows the regional aircraft 528 to push back.

FIG. 5B is a plan of a regional aircraft boarding module 501 that includes the vertically articulating regional aircraft passenger bridge depicted in FIG. 5A after coupling with a regional aircraft 528 according to an embodiment. The regional aircraft boarding module 500 depicted in FIG. 5A has been reconfigured to dock with the regional aircraft 528. Accordingly the regional aircraft passenger bridge support structure 521 supports the regional aircraft passenger bridge 520B in a sill-matching position at the regional aircraft 528. The regional aircraft cab 522B is also depicted in a sill-matching position at the regional aircraft 528. This configuration allows for seamless passenger ingress and egress to the regional aircraft 528.

FIG. 6A is an elevation of a regional aircraft boarding module 600 that includes a vertically articulating cab 622A according to an embodiment. The regional aircraft boarding module 600 includes a regional aircraft rotunda 618 with a rotunda support structure 619 that is coupled to the rotunda 618. In an embodiment, the rotunda support structure 619 is wheeled. In an embodiment, the rotunda support structure 619 is a skid structure (not pictured). In an embodiment, the rotunda support structure 619 is a stationary foot structure (not pictured). The regional aircraft boarding module 600 includes a secondary passenger bridge 620 that is in a stationary position relative to the regional aircraft rotunda 618.

Although a single regional aircraft passenger bridge 620 is depicted, it is understood that a plurality of regional aircraft passenger bridges is attached to the rotunda 618. Similarly, the rotunda 618 is depicted in a schematic 3-dimensional view to illustrate that it provides an interface 611 for either a concourse or a conventional large aircraft passenger bridge, as well as a second regional aircraft passenger bridge (not pictured).

The concourse interfaces at the interface 611, whether by interfacing with a large aircraft passenger bridge cab, or by directly interfacing with the external wall of the concourse. The concourse provides an anchor location for the regional aircraft boarding module 600. In an embodiment, the concourse is a ground-level structure that allows passengers to walk up a ramp until the sill of a given aircraft is reached. In an embodiment, the concourse is a conventional elevated structure that allows passengers to walk down a ramp until the sill of a given aircraft is reached.

In an embodiment a regional aircraft passenger bridge support structure 621 supports the regional aircraft passenger bridge 620 above the tarmac near a regional aircraft 628. The regional aircraft cab 622A is also depicted as being articulated upwardly above the regional aircraft 628 and it is held in suspension while the aircraft stairway 629 articulates to full-open or full closed position.

In an embodiment, the combination of the rotunda support structure 619 and the regional aircraft passenger bridge support structure 621, provide for module mobility to locate the regional aircraft boarding module 600 at either a concourse interface or a large aircraft passenger bridge interface, and for and passenger bridge maneuverability to dock the regional aircraft cab 622A with the regional aircraft 628.

In an embodiment a regional aircraft passenger bridge support structure 621 supports the regional aircraft passenger bridge 620 in position relative to the regional aircraft 628. A regional aircraft cab 622A is depicted as being suspended above the regional aircraft 628 and it is held in suspension while the aircraft stairway 629 articulates to full-open or full closed position. In an embodiment, the regional aircraft boarding module 600 includes the regional aircraft passenger bridge 620 and the regional aircraft cab 622A in an aircraft taxiing position that allows the regional aircraft 628 to move into position to dock or that allows the regional aircraft 628 to push back.

FIG. 6A also depicts an articulable skirt 623, depicted in phantom lines, as it is in a retracted position while the regional aircraft cab 622A is suspended. In an embodiment, the skirt 623 could also be a simple plank that is placed to bridge between the able between the regional aircraft cab 622A and the sill of the regional aircraft 628. In all embodiments set forth in this disclosure, the skirt can be a simple plank.

FIG. 6B is an elevation of a regional aircraft boarding module 601 that includes the vertically articulating regional aircraft cab 622A depicted in FIG. 6A after coupling with the regional aircraft 628 according to an embodiment. The regional aircraft boarding module 600 depicted in FIG. 6A has been reconfigured to dock with the regional aircraft 628. Accordingly the regional aircraft passenger bridge support structure 621 supports the regional aircraft passenger bridge 620B in a sill-matching position at the regional aircraft 628. The regional aircraft cab 622B is also depicted in a sill-matching position at the regional aircraft 628. FIG. 6B also depicts the articulable skirt 623 as it is in an extended position that bridges between the regional aircraft cab 622B and the regional aircraft 628. This configuration allows for seamless passenger ingress and egress to the regional aircraft 628.

FIG. 7 is a plan of a regional aircraft boarding module 700 that includes a slidingly movable cab according to an embodiment. The regional aircraft boarding module 700 includes a regional aircraft rotunda 718, and a plurality of secondary aircraft passenger bridges. In an embodiment, the regional aircraft boarding module 700 includes a first regional aircraft passenger bridge 720 and a first regional aircraft cab 722. The first regional aircraft passenger bridge 720 and the first regional aircraft cab 722 are depicted with the first regional aircraft cab 722 slidingly connected to the first regional aircraft passenger bridge 720 in a position as representing an aircraft taxiing position that allows sufficient clearance a regional aircraft 728 to move into position to articulate its stairs 729 to the open position and to dock, or that allows the regional aircraft 728 to articulate its stairs 729 to the closed position and to push back. The directional arrows depict the motion possible therefor. The position of the first regional aircraft cab 722 exposes the aircraft stairway 729 in a plan view. A second regional aircraft passenger bridge 724 and a second regional aircraft cab 726 are depicted with the second regional aircraft cab 726 slidingly repositioned to dock with the boarding door of the regional aircraft 730. The second regional aircraft cab 726 is slidingly positioned to match the sill of the regional aircraft 730. The second regional aircraft passenger bridge 724 and the second regional aircraft cab 726 are depicted in an aircraft stationary position that allows for seamless passenger ingress and egress while the regional aircraft 730 is docked. Although not pictured, an articulable skirt such as the articulable skirt 623 (FIGS. 6A and 6B) is used according to an embodiment.

FIG. 8A is an elevation of a regional aircraft boarding module 800 that includes a telescopingly movable cab according to an embodiment. The regional aircraft boarding module 800 includes a regional aircraft rotunda 818 with a rotunda support structure 819 that is coupled to the rotunda 818. In an embodiment, the rotunda support structure 819 is wheeled. In an embodiment, the rotunda support structure 819 is a skid structure (not pictured). In an embodiment, the rotunda support structure 819 is a stationary foot structure (not pictured). The regional aircraft boarding module 800 includes a secondary passenger bridge 820 and a regional aircraft cab 822A that is in a stationary position relative to the regional aircraft rotunda 818.

Although a single regional aircraft passenger bridge 820 is depicted, it is understood that a plurality of regional aircraft passenger bridges is attached to the rotunda 818. Similarly, the rotunda 818 is depicted in a schematic 3-dimensional view to illustrate that it provides a first interface 811 for either a concourse or a conventional large aircraft passenger bridge, as well as a second regional aircraft passenger bridge (not pictured). In an embodiment, the regional aircraft cab 822A provides a second interface for an RA 828.

The concourse interfaces at the interface 811, whether by interfacing with a large aircraft passenger bridge cab, or by directly interfacing with the external wall of the concourse. The concourse provides an anchor location for the regional aircraft boarding module 800. In an embodiment, the concourse is a ground-level structure that allows passengers to walk up a ramp until the sill of a given aircraft is reached. In an embodiment, the concourse is a conventional elevated structure that allows passengers to walk down a ramp until the sill of a given aircraft is reached.

In an embodiment a regional aircraft passenger bridge support structure 821 supports the regional aircraft passenger bridge 820 above the tarmac near a regional aircraft 828. A regional aircraft cab 822A is also depicted as being slidingly retracted within the regional aircraft passenger bridge 820 to allow aircraft stairway 829 clearance, and it remains retracted while the aircraft stairway 829 articulates to full-open or full closed position. In an embodiment, the regional aircraft boarding module 800 includes the regional aircraft passenger bridge 820 and the regional aircraft cab 822A in an aircraft taxiing position that allows the regional aircraft 828 to move into position to dock or that allows the regional aircraft 828 to push back.

In an embodiment, the combination of the rotunda support structure 819 and the regional aircraft passenger bridge support structure 821, provide for module mobility to locate the regional aircraft boarding module 800 at either a concourse interface or a large aircraft passenger bridge interface, and for and passenger bridge maneuverability to dock the regional aircraft cab 822A with the regional aircraft 828. Although not pictured, an articulable skirt such as the articulable skirt 623 (FIGS. 6A and 6B) is used according to an embodiment.

FIG. 8B is an elevation of a regional aircraft boarding module that includes the telescopingly movable regional aircraft cab depicted in FIG. 8A after coupling with a regional aircraft according to an embodiment. The regional aircraft boarding module 801 depicted in FIG. 8A has been reconfigured to dock with the regional aircraft 828. Accordingly the regional aircraft passenger bridge support structure 821 supports the regional aircraft passenger bridge 820B in a sill-matching position at the regional aircraft 828. The regional aircraft cab 822B is also depicted in a slidingly extended, sill-matching position at the regional aircraft 828. A skirt (not pictured) is also present such as the articulable skirt 623 depicted in FIG. 6B or the simple plank. This configuration allows for seamless passenger ingress and egress to the regional aircraft 828.

Figure 9:
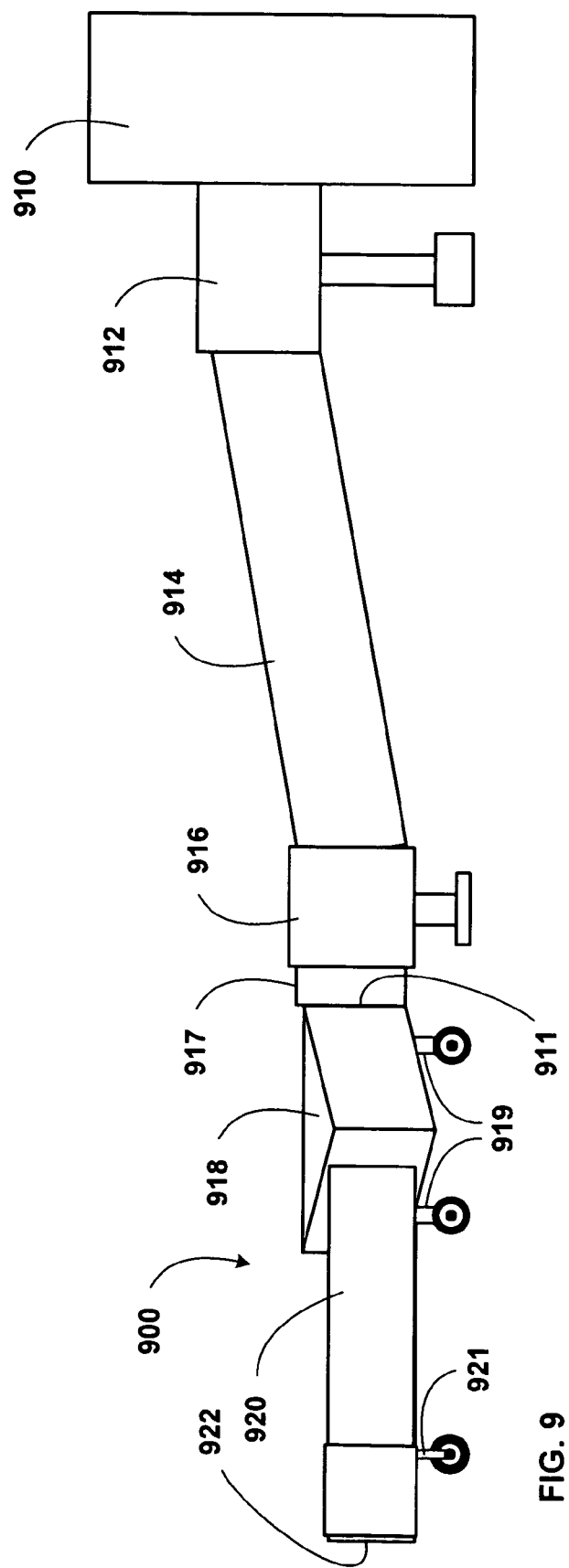
FIG. 9 is an elevation of a regional aircraft boarding module that is coupled to a large aircraft passenger bridge at its cab according to an embodiment.

FIG. 9 is an elevation of a regional aircraft boarding module 900 that is coupled to a large aircraft passenger bridge 914 at its cab 916 according to an embodiment. A conventional passenger bridge 914 is depicted coupled to the concourse 910. A conventional rotunda 912 is coupled to the passenger bridge 914, which in turn is coupled to a cab 916. One ancillary structure of the cab 916 includes a skirt 917 that conventionally interfaces with a large or jumbo aircraft.

The regional aircraft boarding module 900 includes a regional aircraft rotunda 918, an interface 911, and a plurality of secondary aircraft passenger bridges. In an embodiment, the regional aircraft boarding module 900 includes a first regional aircraft passenger bridge 920 and a first regional aircraft cab 922. According to the several embodiments, a least a second regional aircraft passenger bridge (not pictured) and a second regional aircraft cab (not pictured) are present and coupled to the regional aircraft rotunda 918. In an embodiment, the regional aircraft cab 922 is slidingly attached to the regional aircraft passenger bridge 920 as set forth in this disclosure. In an embodiment, the regional aircraft cab 922 is telescopingly and slidingly attached to the regional aircraft passenger bridge 920 as set forth in this disclosure. In an embodiment, the regional aircraft cab 922 is articulably attached to the regional aircraft passenger bridge 920 as set forth in this disclosure. In an embodiment, the regional aircraft cab 922 is attached to the regional aircraft passenger bridge 920 by a combination of at least two of telescopingly, slidingly, and articulably as set forth in this disclosure.

Figure 10:
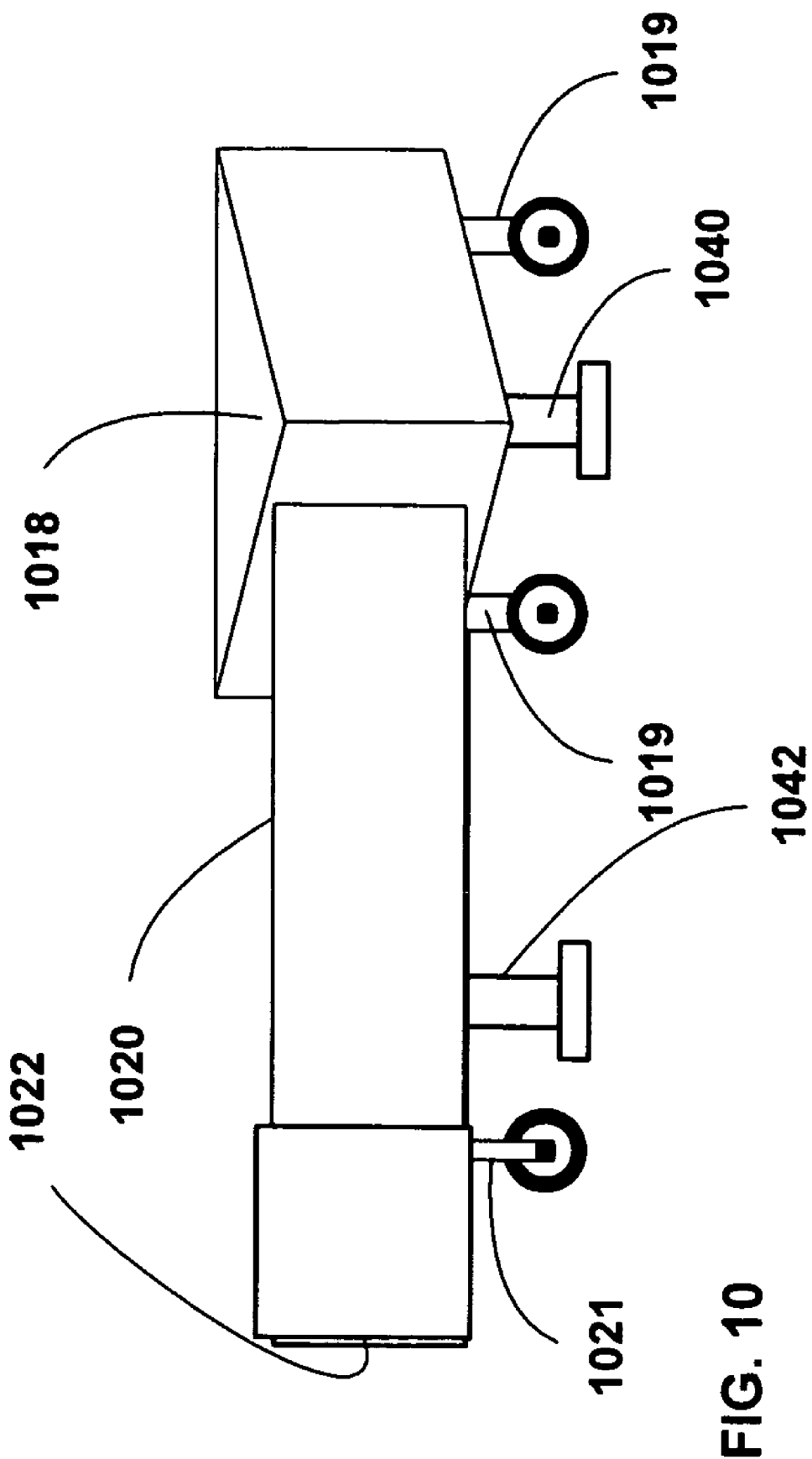
FIG. 10 is an elevation of a regional aircraft boarding module that includes a stationary foot according to an embodiment.

FIG. 10 is an elevation of a regional aircraft boarding module that includes a stationary foot according to an embodiment. The regional aircraft boarding module 1000 includes a regional aircraft rotunda 1018, and a plurality of secondary aircraft passenger bridges. In an embodiment, the regional aircraft boarding module 1000 includes a first regional aircraft passenger bridge 1020 and a first regional aircraft cab 1022. According to the several embodiments, a least a second regional aircraft passenger bridge (not pictured) and a second regional aircraft cab (not pictured) are present and coupled to the regional aircraft rotunda 1018. In an embodiment, the regional aircraft cab 1022 is slidingly attached to the regional aircraft passenger bridge 1020 as set forth in this disclosure. In an embodiment, the regional aircraft cab 1022 is telescopingly and slidingly attached to the regional aircraft passenger bridge 1020 as set forth in this disclosure. In an embodiment, the regional aircraft cab 1022 is articulably attached to the regional aircraft passenger bridge 1020 as set forth in this disclosure. In an embodiment, the regional aircraft cab 1022 is attached to the regional aircraft passenger bridge 1020 by a combination of at least two of telescopingly, slidingly, and articulably as set forth in this disclosure.

A rotunda support structure 1019 is coupled to the rotunda 518. A stationary a rotunda support structure 1040 is also coupled to the rotunda 1018. In an embodiment, the stationary a rotunda support structure 1040 is a retractable foot. In an embodiment, the stationary a rotunda support structure 1040 is a skid. In an embodiment, the stationary a rotunda support structure 1040 is a structure such as a foot that can be bolted or otherwise affixed to the tarmac. In an embodiment, a regional aircraft passenger bridge support structure 1021 supports the regional aircraft passenger bridge 1020. A stationary regional aircraft passenger bridge support structure 1042 is also coupled to the regional aircraft passenger bridge 1022. In an embodiment, the stationary regional aircraft passenger bridge support structure 1042 is a retractable foot. In an embodiment, the stationary regional aircraft passenger bridge support structure 1042 is a skid. In an embodiment, the stationary regional aircraft passenger bridge support structure 1042 is a structure such as a foot that can be bolted or otherwise affixed to the tarmac.

Figure 11:
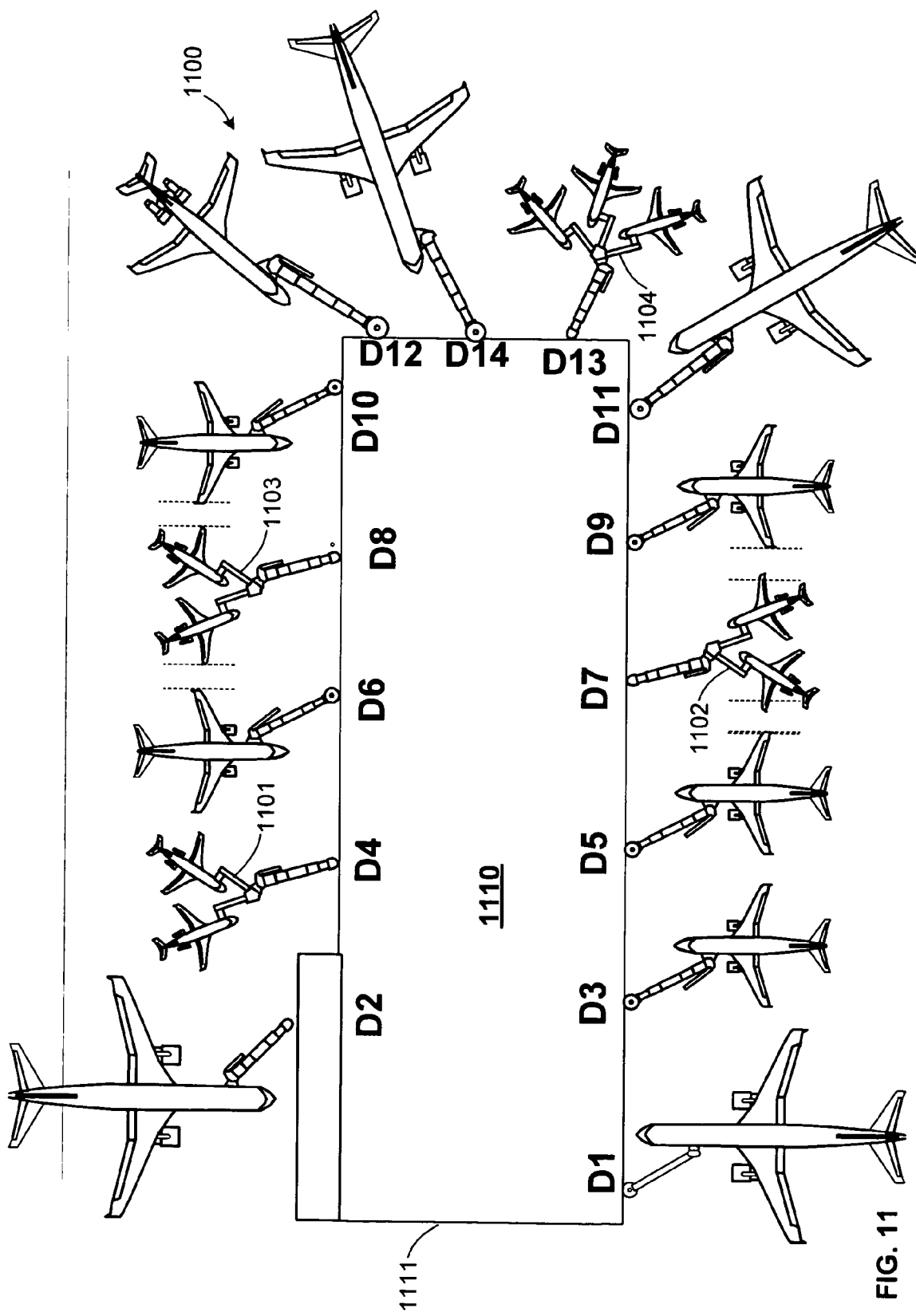
FIG. 11 is a plan of a concourse that has been retrofitted or designed according to a regional aircraft boarding module according to an embodiment.

FIG. 11 is a plan of a concourse that has been retrofitted or designed according to an embodiment. In an embodiment, the concourse 1110 is attached to other structures at a surface 1111. In an embodiment, the concourse 1110 is the redesigned "Concourse D" at the U.S. airport SLC.

In an embodiment, a regional aircraft boarding module 1101 is deployed at Gate D4 according to an embodiment. The regional aircraft boarding module 1101 is mated to an existing large aircraft passenger bridge, which in turn is coupled to the concourse 1110. Gate D4 is next to Gate D2, which accommodates an international arrival large aircraft or a jumbo aircraft. The regional aircraft boarding module 1101 is configured to accommodate two RAs. Also similar to the regional aircraft boarding module 1101, a regional aircraft boarding module 1102 is deployed at Gate D7 according to an embodiment. The regional aircraft boarding module 11012 is mated to an existing large aircraft passenger bridge, which in turn is coupled to the concourse 1110. The regional aircraft boarding module 1102 is configured to accommodate two RAs. Similarly, a regional aircraft boarding module 1103 is deployed at Gate D8 according to an embodiment. The regional aircraft boarding module 1103 is mated to an existing large aircraft passenger bridge, which in turn is coupled to the concourse 1110. The regional aircraft boarding module 1103 is configured to accommodate two RAs. A regional aircraft boarding module 1104 is deployed at Gate D 13according to an embodiment. The regional aircraft boarding module 1104 is mated to an existing large aircraft passenger bridge, which in turn is coupled to the concourse 1110. The regional aircraft boarding module 1104 is configured to accommodate three RAs. Other large aircraft are docked at the terminal 1100 including large aircraft at Gates D1, D2, D3, D5, D6, D9, D10, D11, D12, and D14. The RAs depicted in FIG. 11 are all configured such that no waiting, except for clear taxi alleys, is required for any aircraft in order to dock and/or to push back. In an embodiment, each of the regional aircraft boarding modules depicted in FIG. 11, includes any of the characteristics for any of the regional aircraft boarding modules set forth in this disclosure.

Figure 12:
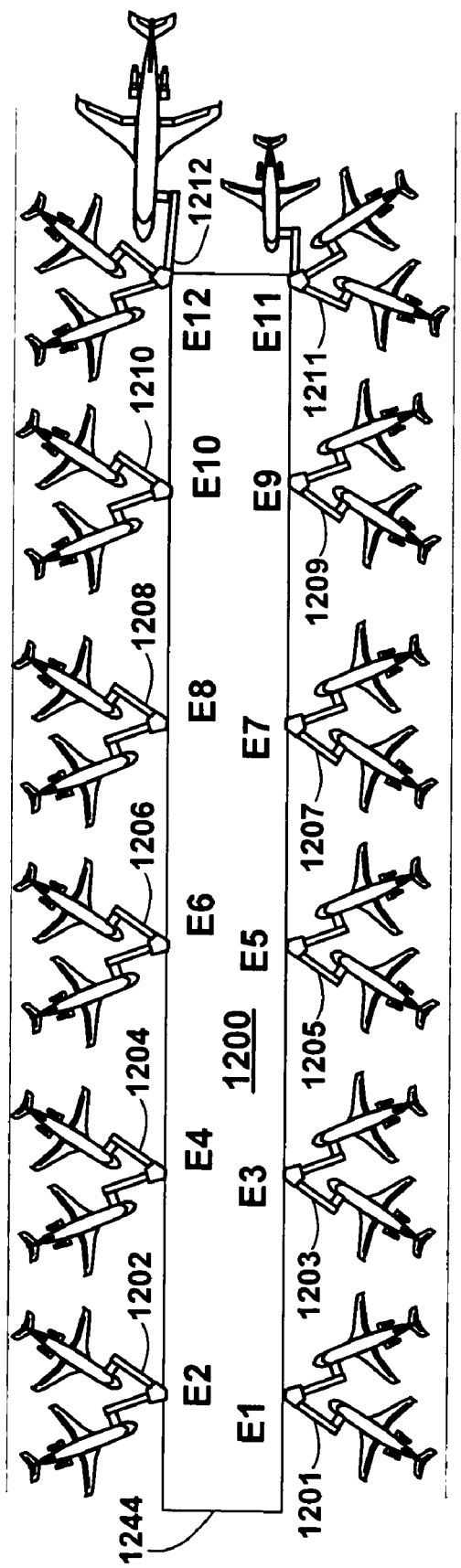
FIG. 12 is a plan of a concourse that includes a regional aircraft boarding module that interfaces directly with the exterior wall of a concourse according to an embodiment.

FIG. 12 is a plan of a concourse that has been retrofitted or designed according to an embodiment. In an embodiment, the concourse 1200 is a midfield terminal. In an embodiment, the concourse 1200 is attached at an interface 1244 to other airport structures such as a bridge to another concourse. In an embodiment, the regional aircraft rotunda is configured to interface with an existing wall of the concourse 1200.

The concourse 1200 interfaces with at least one regional aircraft boarding module. In an embodiment, the concourse 1200 is a ground-level structure that allows passengers to walk up a ramp until the sill of a given aircraft is reached. In an embodiment, the concourse 1200 is a conventional elevated structure that allows passengers to walk down a ramp until the sill of a given aircraft is reached.

In an embodiment, a regional aircraft boarding module 1201 is deployed at Gate E1 according to an embodiment. The regional aircraft boarding module 1201 is configured to accommodate two RAs. In an embodiment, a regional aircraft boarding module 1202 is deployed at Gate E2 according to an embodiment. The regional aircraft boarding module 1202 is configured to accommodate two RAs. In an embodiment, a regional aircraft boarding module 1203 is deployed at Gate E3 according to an embodiment. The regional aircraft boarding module 1203 is configured to accommodate two RAs. In an embodiment, a regional aircraft boarding module 1204 is deployed at Gate E4 according to an embodiment. The regional aircraft boarding module 1204 is configured to accommodate two RAs. In an embodiment, a regional aircraft boarding module 1205 is deployed at Gate E5 according to an embodiment. The regional aircraft boarding module 1205 is configured to accommodate two RAs. In an embodiment, a regional aircraft boarding module 1206 is deployed at Gate E6 according to an embodiment. The regional aircraft boarding module 1206 is configured to accommodate two RAs. In an embodiment, a regional aircraft boarding module 1207 is deployed at Gate E7 according to an embodiment. The regional aircraft boarding module 1207 is configured to accommodate two RAs. In an embodiment, a regional aircraft boarding module 1208 is deployed at Gate E2 according to an embodiment. The regional aircraft boarding module 1208 is configured to accommodate two RAs. In an embodiment, a regional aircraft boarding module 1209 is deployed at Gate E9 according to an embodiment. The regional aircraft boarding module 1209 is configured to accommodate two RAs. In an embodiment, a regional aircraft boarding module 1210 is deployed at Gate E10 according to an embodiment. The regional aircraft boarding module 1210 is configured to accommodate two RAs. In an embodiment, a regional aircraft boarding module 1211 is deployed at Gate E11 according to an embodiment. The regional aircraft boarding module 1211 is configured to accommodate three RAs. In an embodiment, a regional aircraft boarding module 1212 is deployed at Gate E12 according to an embodiment. The regional aircraft boarding module 1212 is configured to accommodate three RAs. In an embodiment, however, one regional aircraft passenger bridge can be further extended and/or elevated to accommodate a large aircraft such as a MD-90 as illustrated. Accordingly, one embodiment for the concourse 1310 includes appending sufficient large aircraft, e.g. up to four or up to six, at the ends of the concourse 1310, to regional aircraft boarding module 1212. In this embodiment, the concourse 1310 is a self-contained unit for a given business entity such as a single airline at a given airport, or two partnering airlines such as a mainline carrier and a regional carrier. In an embodiment, all large aircraft at the concourse 1310 supply the total passenger transfer needs of the mainline carrier for the RAs that are docked thereto. In an embodiment, all RAs aircraft at the concourse 1310 supply the total passenger transfer needs of the regional carrier for the large aircraft that are docked thereto. It is understood that a given mainline carrier may not be a partner airline with a regional carrier, but these carries necessarily have a shared fare for a given passenger. Such an embodiment is useful by way of non-limiting example, at a smaller airport such as Boise, Id., USA.

In an embodiment, each of the regional aircraft boarding modules depicted in FIG. 12, includes any of the characteristics for any of the regional aircraft boarding modules set forth in this disclosure.

Figure 13:
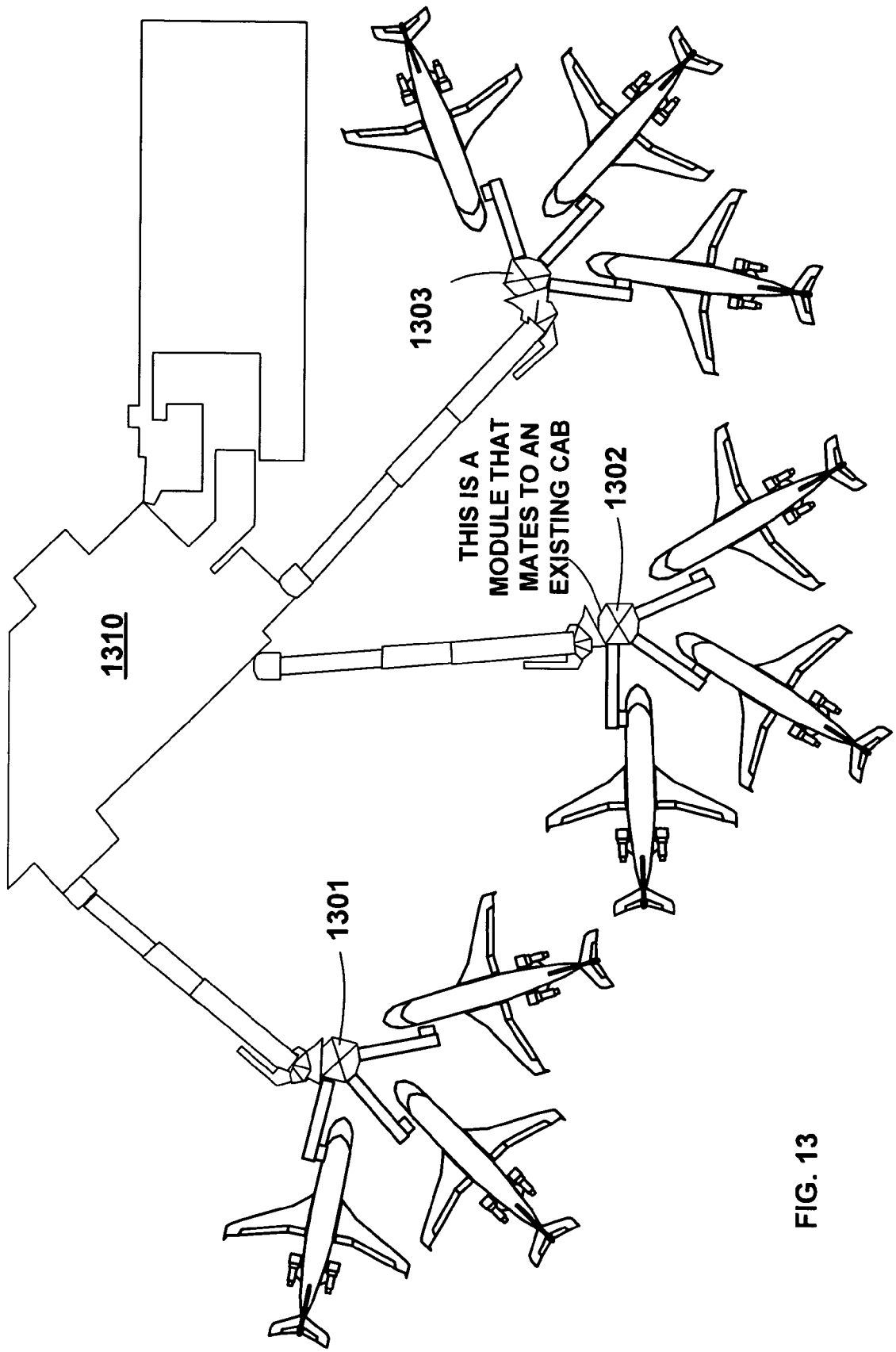
FIG. 13 is a plan of a concourse that has been retrofitted or designed according to a regional aircraft boarding module according to an embodiment.

FIG. 13 is a plan of a concourse that has been retrofitted or designed according to an embodiment. In an embodiment, the concourse 1310 is a retrofitted structure such as a portion of the U.S. airport SLC Terminal B. In an embodiment, the concourse 1310 is attached to other airport structures such as a bridge to another concourse. In an embodiment, the passenger bridge that is coupled to a regional aircraft boarding module 1301 is an existing bridge. In an embodiment, the passenger bridge that is coupled to a regional aircraft boarding module 1303 is an existing bridge. In an embodiment, the "passenger bridge" that is coupled to a regional aircraft boarding module 1302 is a new, fixed passenger tunnel.

In an embodiment, a regional aircraft boarding module 1301 is deployed at a gate in connection to an existing large aircraft passenger bridge according to an embodiment. The regional aircraft boarding module 1301 is configured to accommodate three RAs. In an embodiment, a regional aircraft boarding module 1302 is deployed at a gate in connection to an existing large aircraft passenger bridge according to an embodiment. The regional aircraft boarding module 1302 is configured to accommodate three RAs. In an embodiment, a regional aircraft boarding module 1303 is deployed at a gate in connection to an existing large aircraft passenger bridge according to an embodiment. The regional aircraft boarding module 1303 is configured to accommodate three RAs.

In an embodiment, each of the regional aircraft boarding modules depicted in FIG. 13, includes any of the characteristics for any of the regional aircraft boarding modules set forth in this disclosure.

Figure 14:
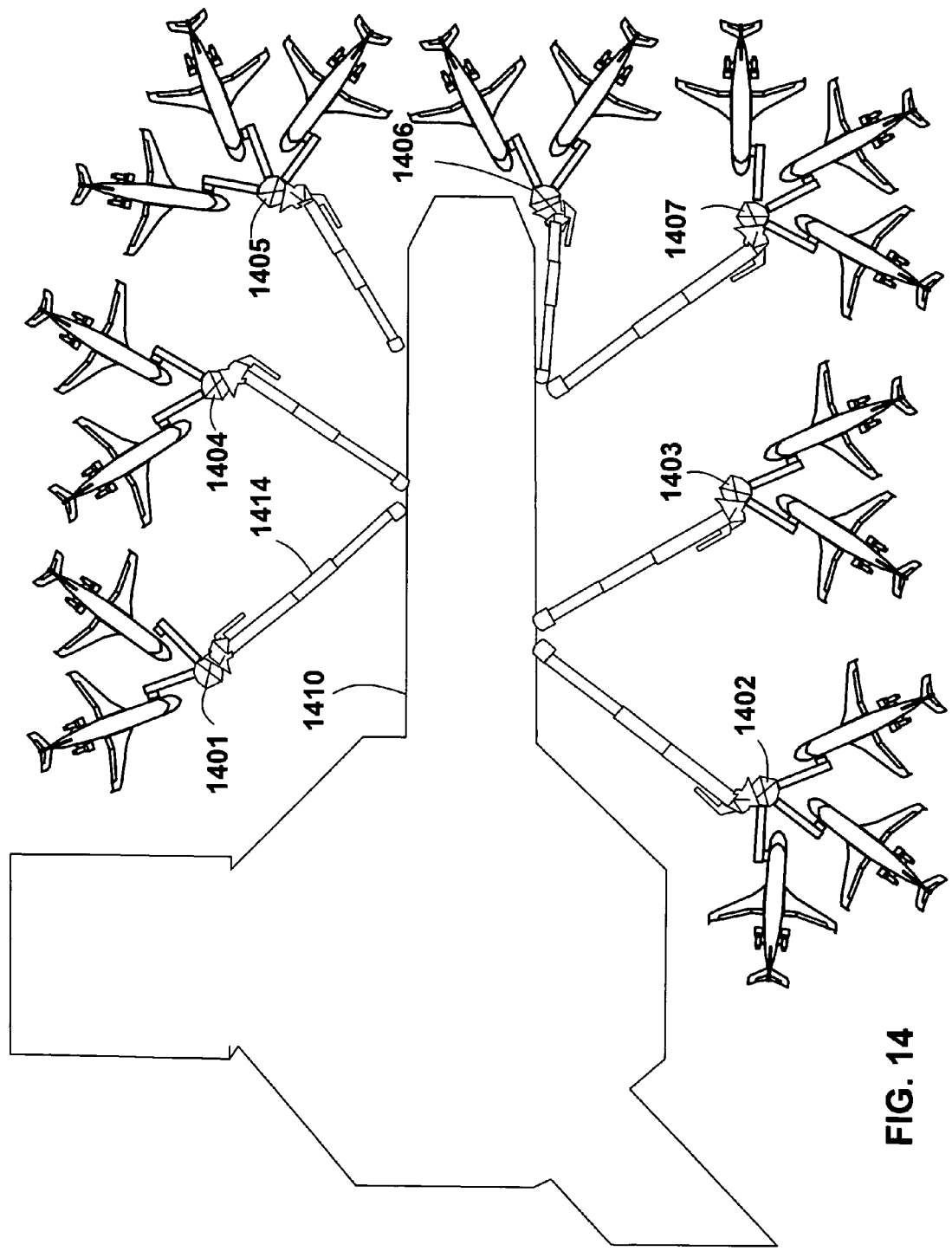
FIG. 14 is a plan of a concourse that has been retrofitted or designed according to a regional aircraft boarding module according to an embodiment.

FIG. 14 is a plan of a concourse that has been retrofitted or designed according to a regional aircraft boarding module according to an embodiment. In an embodiment, the concourse 1410 is a retrofitted structure such as a portion of the U.S. airport SFO Terminal 3. In an embodiment, the concourse 1410 is attached to other airport structures such as a bridge to another concourse. The concourse 1410 includes a plurality of large aircraft passenger bridges 1414, one of which is designated.

In an embodiment, a regional aircraft boarding module 1401 is deployed at a gate in connection to an existing large aircraft passenger bridge according to an embodiment. The regional aircraft boarding module 1401 interfaces with a large aircraft passenger bridge 1414. The regional aircraft boarding module 1401 is configured to accommodate two RAs. In an embodiment, a regional aircraft boarding module 1402 is deployed at a gate according to an embodiment. The regional aircraft boarding module 1402 interfaces with a large aircraft passenger bridge. The regional aircraft boarding module 1402 is configured to accommodate three RAs. In an embodiment, a regional aircraft boarding module 1403 is deployed at a gate according to an embodiment. The regional aircraft boarding module 1403 interfaces with a large aircraft passenger bridge. The regional aircraft boarding module 1403 is configured to accommodate two RAs. In an embodiment, a regional aircraft boarding module 1404 is deployed at a gate according to an embodiment. The regional aircraft boarding module 1404 interfaces with a large aircraft passenger bridge. The regional aircraft boarding module 1404 is configured to accommodate two RAs. In an embodiment, a regional aircraft boarding module 1405 is deployed at a gate according to an embodiment. The regional aircraft boarding module 1405 interfaces with a large aircraft passenger bridge. The regional aircraft boarding module 1405 is configured to accommodate three RAs. In an embodiment, a regional aircraft boarding module 1406 is deployed at a gate according to an embodiment. The regional aircraft boarding module 1406 interfaces with a large aircraft passenger bridge. The regional aircraft boarding module 1406 is configured to accommodate two RAs. In an embodiment, a regional aircraft boarding module 1407 is deployed at a gate according to an embodiment. The regional aircraft boarding module 1407 interfaces with a large aircraft passenger bridge. The regional aircraft boarding module 1407 is configured to accommodate three RAs.

In an embodiment, each of the regional aircraft boarding modules depicted in FIG. 14, includes any of the characteristics for any of the regional aircraft boarding modules set forth in this disclosure.

Figure 15:
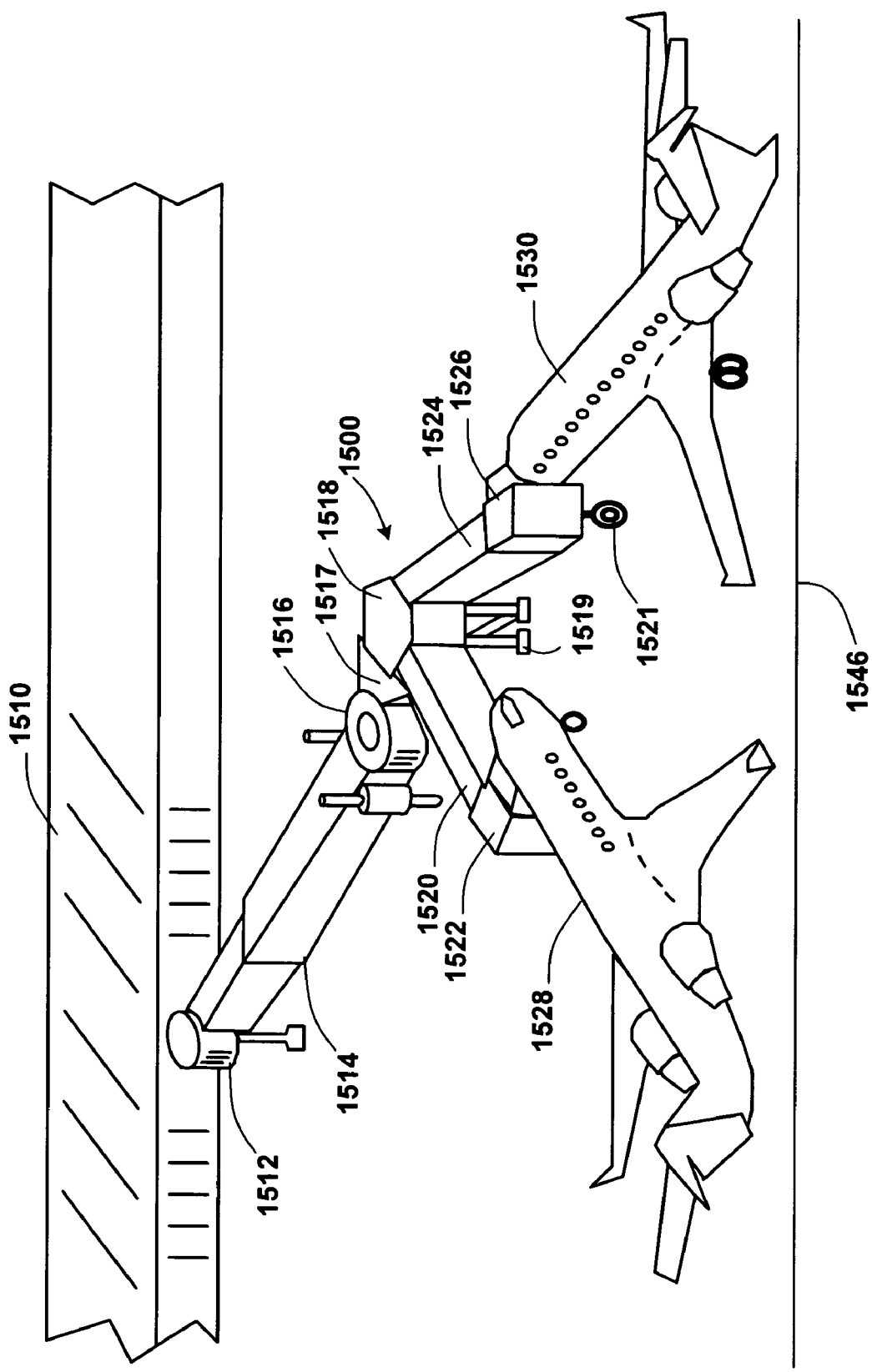
FIG. 15 is a perspective elevation of a concourse that has been retrofitted or designed according to a regional aircraft boarding module 1500 according to an embodiment.

FIG. 15 is a perspective elevation of a concourse that has been retrofitted or designed according to a regional aircraft boarding module 1500 according to an embodiment. In an embodiment, the concourse 1510 is a retrofitted structure and can be a perspective elevation of a portion of the plan depicted in FIG. 1 for the regional aircraft boarding module 100. In an embodiment, the concourse 1510 is attached to other airport structures such as a bridge to another concourse. The concourse 1510 includes at least one large aircraft passenger bridge 1514, one of which is designated.

The concourse 1510 interfaces with the module 1500 at the rotunda 1518 of the regional aircraft boarding module 1500 and the skirt 1517 of the large aircraft passenger bridge 1514. The concourse 1510 provides an anchor location for the regional aircraft boarding module 500. In an embodiment, the concourse 1510 is a ground-level structure that allows passengers to walk up a ramp until the sill of a given aircraft is reached. In an embodiment, the concourse 1510 is a conventional elevated structure that allows passengers to walk down a ramp until the sill of a given aircraft is reached.

A conventional passenger bridge is depicted coupled to the concourse 1510. A conventional rotunda 1512 is coupled to a passenger bridge 1514, which in turn is coupled to a cab 1516. One ancillary structure of the cab 1516 includes a skirt 1517 that conventionally interfaces with a large or jumbo aircraft. Another ancillary structure includes a boarding bridge stair that is not depicted for clarity of other structures.

The regional aircraft boarding module 1500 includes a regional aircraft rotunda 1518, and a plurality of secondary aircraft passenger bridges. In an embodiment, the regional aircraft boarding module 1500 includes a first regional aircraft passenger bridge 1520 and a first regional aircraft cab 1522, and a second regional aircraft passenger bridge 1524 and a second regional aircraft cab 1526. In an embodiment, the regional aircraft cabs 1522 and 1526 include structures similar to the skirt 1517. In an embodiment, the regional aircraft cabs 1522 and 1526 are slidingly attached to their respective secondary aircraft passenger bridges 1520 and 1524 as set forth in this disclosure. In an embodiment, the regional aircraft cabs 1522 and 126 are telescopingly and slidingly attached to their respective secondary aircraft passenger bridges 1520 and 1524 as set forth in this disclosure.

Operation of the regional aircraft boarding module 1500 includes docking at least one regional aircraft thereto. In an embodiment, a first regional aircraft 1528 is docked to the regional aircraft passenger bridge 1520. In an embodiment, a second regional aircraft 1530 is docked to the regional aircraft passenger bridge 1524 of the regional aircraft boarding module 1500.

In an embodiment, the docking bay area for the regional aircraft 1528 and 1530 is the docking bay area for a jumbo aircraft such as a Boeing 767 wide body jet. In an embodiment, the docking bay area for the regional aircraft 1528 and 1530 is the docking bay area for a large aircraft such as a Boeing 737 jet or a Boeing 757 jet. Where a given large or jumbo aircraft has a given wingspan, the wingspan is the major characteristic dimension that relates to the docking bay area sufficient for about only a single large or jumbo aircraft. The area is calculated by adding the depth dimension from the exterior of the concourse to the object-free line 1546. In any event, the minimum of such an area is the wingspan length, multiplied by the fuselage length.

Because the exact docking bay area sufficient for about only a single large or jumbo aircraft, varies among airports, and indeed within a single airport, another definition of "the docking bay area sufficient for about only a single large or jumbo aircraft" includes the area between two docking bays, which previously supported a large or jumbo aircraft.

Figure 16:
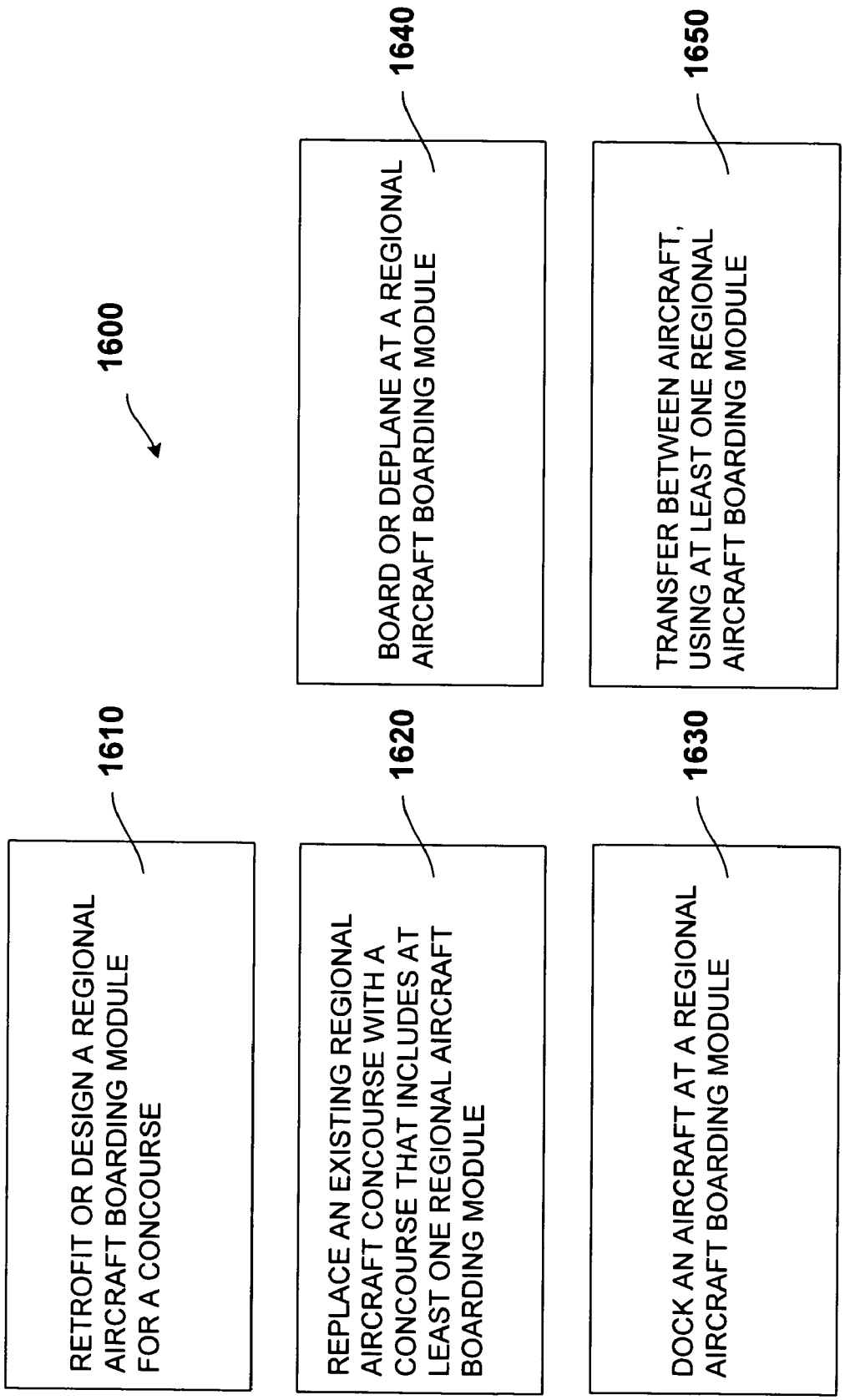
FIG. 16 is a method flow diagram according to an embodiment.

FIG. 16 is a method flow diagram according to an embodiment. At 1610, a method embodiment includes retrofitting or designing a regional aircraft boarding module for a concourse. Non-limiting examples include SFO Terminal 3, SLC Terminal B, SLC Terminal D, and LAX Terminal 8.

At 1620, a method embodiment includes replacing an existing regional aircraft concourse with a concourse that includes at least one regional aircraft boarding module. In another embodiment at 1620, an existing regional aircraft concourse is retrofitted with a regional aircraft boarding module.

At 1630, a method embodiment includes docking an aircraft at a regional aircraft boarding module.

At 1640, a method embodiment includes passenger boarding or deplaning at a regional aircraft boarding module. A method embodiment also includes baggage and/or freight boarding or deplaning at a regional aircraft boarding module.

At 1650, a method embodiment includes passenger transferring between two aircraft, using at least one regional aircraft boarding module. A method embodiment also includes baggage and/or freight transferring at a regional aircraft boarding module.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

The preceding description has been presented only to illustrate and describe disclosed embodiments. It is not intended to be exhaustive or to limit the embodiments to any precise form disclosed. Many modifications and variations are possible in light of the above teaching.

Several embodiments were chosen and described in order to best explain the principles of the embodiments and their practical application. The preceding description is intended to enable others skilled in the art to best utilize the embodiments in various embodiments and with various modifications as are suited to the particular use contemplated. It is intended that the scope of the disclosed embodiments be defined by the following claims.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. An apparatus comprising:
   a regional aircraft rotunda configured to interface with an airport terminal; and
   a plurality of regional aircraft passenger bridges coupled to the regional aircraft rotunda, wherein each of the plurality of regional aircraft passenger bridges is configured to interface with a regional aircraft.

2. The apparatus of claim 1, wherein the regional aircraft rotunda is configured to interface with a cab of a large aircraft passenger bridge.

3. The apparatus of claim 1, wherein the regional aircraft rotunda is directly connected to a structure selected from an apron drive large aircraft passenger bridge, a fixed elevating large aircraft passenger bridge, a radial drive large aircraft passenger bridge, and a fixed passenger tunnel.

4. The apparatus of claim 1, wherein the regional aircraft rotunda is configured to interface with an exterior wall of the aircraft terminal.

5. The apparatus of claim 1, wherein each of the plurality of regional aircraft passenger bridges includes a regional aircraft cab.

6. The apparatus of claim 1, wherein each of the plurality of regional aircraft passenger bridges is interfaceable with the regional aircraft rotunda by one of a horizontal articulation, a vertical articulation, a sliding structure, and combinations thereof.

7. The apparatus of claim 1, wherein each of the plurality of regional aircraft passenger bridges is interfaceable with the regional aircraft rotunda by one of a horizontal articulation, a vertical articulation, a sliding structure, and combinations thereof, and wherein each of the plurality of regional aircraft passenger bridges includes a regional aircraft cab.

8. The apparatus of claim 1, wherein each of the plurality of regional aircraft passenger bridges includes a regional aircraft cab that is selected from a cab that is telescopingly coupled to the regional aircraft passenger bridge, a cab that is slidingly coupled to the regional aircraft passenger bridge, a cab that is articulatingly coupled to the regional aircraft passenger bridge, and combinations thereof.

9. The apparatus of claim 1, wherein the regional aircraft rotunda includes a shape selected from a polygon, a pentagon, a hexagon, a rectilinear shape, a curvilinear shape, and combinations thereof.

10. An apparatus comprising:
    a regional aircraft rotunda configured to interface with an airport terminal;
    a regional aircraft rotunda support structure coupled to and disposed below the regional aircraft rotunda;
    a plurality of regional aircraft passenger bridges coupled to the regional aircraft rotunda, wherein each of the plurality of regional aircraft passenger bridges is configured to interface with a regional aircraft; and
    coupled to and below each of the regional aircraft passenger bridges, a regional aircraft passenger bridge support structure.

11. The apparatus of claim 10, wherein the regional aircraft rotunda support structure includes an article selected from a wheel, a skid, a foot, and combinations thereof.

12. The apparatus of claim 10, wherein at least one of the regional aircraft passenger bridge support structures includes an article selected from a wheel, a skid, a foot, and combinations thereof.

13. The apparatus of claim 10, wherein the regional aircraft rotunda support structure includes an article selected from a wheel, a skid, a foot, and combinations thereof, and wherein at least one of the regional aircraft passenger bridge support structures includes an article selected from a wheel, a skid, a foot, and combinations thereof.

14. The apparatus of claim 10, wherein each of the plurality of regional aircraft passenger bridges is interfaceable with the regional aircraft rotunda by one of a horizontal articulation, a vertical articulation, a sliding structure, and combinations thereof.

15. The apparatus of claim 10, wherein each of the plurality of regional aircraft passenger bridges includes a regional aircraft cab that is selected from a cab that is telescopingly coupled to the regional aircraft passenger bridge, a cab that is slidingly coupled to the regional aircraft passenger bridge, a cab that is articulatingly coupled to the regional aircraft passenger bridge, and combinations thereof.

16. A method comprising:
    using a regional aircraft boarding module, the regional aircraft boarding module including:
    a regional aircraft rotunda configured to interface with an airport terminal; and
    a plurality of regional aircraft passenger bridges coupled to the regional aircraft rotunda, wherein each of the plurality of regional aircraft passenger bridges is configured to interface with a regional aircraft.

17. The method of claim 16, wherein using includes coupling the regional aircraft boarding module directly to an airport concourse.

18. The method of claim 16, wherein using includes coupling the regional aircraft boarding module to a large aircraft passenger bridge.

19. The method of claim 16, wherein using includes coupling the regional aircraft boarding module to a large aircraft passenger bridge at a first interface, and to a plurality of regional aircraft at a plurality of second interfaces.

20. The method of claim 16, wherein using includes coupling the regional aircraft boarding module between an airport concourse and at least one a plurality of regional aircraft, wherein coupling includes a method selected from coupling a cab that is telescopingly coupled to the regional aircraft passenger bridge, coupling a cab that is slidingly coupled to the regional aircraft passenger bridge, coupling a cab that is articulatingly coupled to the regional aircraft passenger bridge, and combinations thereof.

21. The method of claim 16, further including using at least one large aircraft at the regional aircraft boarding module.

* * * * *